(12) United States Patent
Choi et al.

(10) Patent No.: US 12,431,596 B2
(45) Date of Patent: Sep. 30, 2025

(54) BATTERY, CURRENT COLLECTOR PLATE APPLIED THERETO, AND BATTERY PACK AND VEHICLE COMPRISING THE SAME

(71) Applicant: LG ENERGY SOLUTION, LTD., Seoul (KR)

(72) Inventors: Su-Ji Choi, Daejeon (KR); Kwang-Su Hwangbo, Daejeon (KR); Geon-Woo Min, Daejeon (KR); Min-Ki Jo, Daejeon (KR); Do-Gyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/286,708

(22) PCT Filed: Jul. 19, 2022

(86) PCT No.: PCT/KR2022/010561
§ 371 (c)(1),
(2) Date: Oct. 12, 2023

(87) PCT Pub. No.: WO2023/063541
PCT Pub. Date: Apr. 20, 2023

(65) Prior Publication Data
US 2024/0195026 A1 Jun. 13, 2024

(30) Foreign Application Priority Data

Oct. 14, 2021 (KR) .................. 10-2021-0137001
Dec. 14, 2021 (KR) .................. 10-2021-0178999
Dec. 31, 2021 (KR) .................. 10-2021-0194611

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/107* (2021.01);
(Continued)

(58) Field of Classification Search
CPC ......... H01M 10/0431; H01M 10/0422; H01M 50/538; H01M 50/107; H01M 50/186;
(Continued)

(56) References Cited

U.S. PATENT DOCUMENTS 4,879,187 A 11/1989 Biegger
5,665,483 A 9/1997 Saito et al.
(Continued)

FOREIGN PATENT DOCUMENTS

CN 1495943 A 5/2004
CN 1591927 A 3/2005
(Continued)

OTHER PUBLICATIONS

European Search Report mailed in EP 22 15 2207 on Jul. 22, 2022 (9 pages).
(Continued)

*Primary Examiner* — Kiran Quraishi Akhtar
(74) *Attorney, Agent, or Firm* — Birch, Stewart, Kolasch & Birch, LLP

(57) ABSTRACT

A battery includes an electrode assembly including a first electrode tab and a second electrode tab defined by an uncoated portion; a battery housing accommodating the electrode assembly and electrically connected to the second electrode tab; a cap plate configured to close an open portion of the battery housing; a current collector plate including an edge portion, a tab coupling portion extended inwards from the edge portion and coupled to the first electrode tab and a (Continued)

terminal coupling portion spaced apart from the tab coupling portion; and a terminal coupled to the terminal coupling portion.

12 Claims, 23 Drawing Sheets

(51) Int. Cl.
| | |
|---|---|
| H01M 50/107 | (2021.01) |
| H01M 50/186 | (2021.01) |
| H01M 50/242 | (2021.01) |
| H01M 50/249 | (2021.01) |
| H01M 50/559 | (2021.01) |
| H01M 50/574 | (2021.01) |

(52) U.S. Cl.
CPC ....... *H01M 50/186* (2021.01); *H01M 50/242* (2021.01); *H01M 50/249* (2021.01); *H01M 50/559* (2021.01); *H01M 50/574* (2021.01); *H01M 2220/20* (2013.01)

(58) Field of Classification Search
CPC ............. H01M 50/242; H01M 50/249; H01M 50/559; H01M 50/574; H01M 50/528; H01M 50/533; H01M 50/536; H01M 50/213; H01M 50/583; H01M 50/586; H01M 50/593; H01M 2220/20; Y02P 70/50; Y02E 60/10
See application file for complete search history.

(56) References Cited

U.S. PATENT DOCUMENTS

| | | | |
|---|---|---|---|
| 6,399,237 B1 | 6/2002 | Souliac et al. |
| 6,451,473 B1 | 9/2002 | Saito et al. |
| 6,677,082 B2 | 1/2004 | Thackeray et al. |
| 6,680,143 B2 | 1/2004 | Thackeray et al. |
| 9,496,539 B2 | 11/2016 | Tyler et al. |
| 9,496,557 B2 | 11/2016 | Fuhr et al. |
| 2004/0126650 A1 | 7/2004 | Kim |
| 2004/0131930 A1 | 7/2004 | Nakanishi et al. |
| 2005/0048365 A1 | 3/2005 | Miyahisa et al. |
| 2005/0181272 A1 | 8/2005 | Kim |
| 2005/0214640 A1 | 9/2005 | Kim |
| 2005/0260487 A1 | 11/2005 | Kim et al. |
| 2005/0260489 A1 | 11/2005 | Kim |
| 2005/0287428 A1† | 12/2005 | Cheon |
| 2005/0287432 A1 | 12/2005 | Cheon et al. |
| 2006/0024574 A1 | 2/2006 | Yim et al. |
| 2006/0063063 A1 | 3/2006 | Mori et al. |
| 2006/0204841 A1 | 9/2006 | Satoh et al. |
| 2008/0026293 A1 | 1/2008 | Marple et al. |
| 2008/0182159 A1 | 7/2008 | Mitani et al. |
| 2009/0104520 A1 | 4/2009 | Marple |
| 2009/0208830 A1 | 8/2009 | Okabe et al. |
| 2010/0151317 A1 | 6/2010 | Kim et al. |
| 2010/0316897 A1 | 12/2010 | Kozuki et al. |
| 2010/0330414 A1 | 12/2010 | More |
| 2011/0171508 A1 | 7/2011 | Kim |
| 2011/0256433 A1 | 10/2011 | Fuhr et al. |
| 2011/0305928 A1 | 12/2011 | Kim et al. |
| 2012/0297611 A1 | 11/2012 | Ma |
| 2012/0301756 A1† | 11/2012 | Fuhr |
| 2013/0040176 A1† | 2/2013 | Tyler |
| 2013/0183556 A1 | 7/2013 | Kim |
| 2013/0273401 A1 | 10/2013 | Lee et al. |
| 2014/0113185 A1 | 4/2014 | Mori et al. |
| 2014/0205868 A1 | 7/2014 | Phillips |
| 2014/0234676 A1 | 8/2014 | Tyler et al. |
| 2015/0104694 A1 | 4/2015 | Okuda et al. |
| 2015/0140379 A1 | 5/2015 | Yau |
| 2016/0043373 A1 | 2/2016 | Arishima et al. |
| 2016/0099451 A1 | 4/2016 | Murai et al. |
| 2016/0228056 A1 | 8/2016 | Masson et al. |
| 2016/0329542 A1 | 11/2016 | Tyler et al. |
| 2017/0047575 A1 | 2/2017 | Tsuji et al. |
| 2017/0062789 A1 | 3/2017 | Sim et al. |
| 2017/0187068 A1 | 6/2017 | Morisawa et al. |
| 2017/0200935 A1 | 7/2017 | Hong et al. |
| 2017/0256769 A1 | 9/2017 | Wynn et al. |
| 2017/0372848 A1 | 12/2017 | Yoon et al. |
| 2018/0182560 A1* | 6/2018 | Khakhalev ........... H01G 9/0029 |
| 2018/0205044 A1 | 7/2018 | Urushihara |
| 2019/0280256 A1 | 9/2019 | Baik et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0212374 A1 | 7/2020 | Gaugler |
| 2020/0235369 A1 | 7/2020 | Jeong et al. |
| 2020/0295341 A1 | 9/2020 | Kim et al. |
| 2021/0039195 A1 | 2/2021 | Jost et al. |
| 2021/0043915 A1 | 2/2021 | Mantoku et al. |
| 2021/0075051 A1 | 3/2021 | Zhou |
| 2021/0210792 A1 | 7/2021 | Mukai et al. |
| 2021/0257652 A1 | 8/2021 | Ko et al. |
| 2021/0280835 A1 | 9/2021 | Peng et al. |
| 2021/0344033 A1 | 11/2021 | Park et al. |
| 2022/0037712 A1 | 2/2022 | Kritzer et al. |
| 2022/0131216 A1 | 4/2022 | Park et al. |

FOREIGN PATENT DOCUMENTS

| | | |
|---|---|---|
| CN | 1832228 A | 9/2006 |
| CN | 102217116 A | 10/2011 |
| CN | 204596910 U | 8/2015 |
| CN | 105489812 A | 4/2016 |
| CN | 108159350 A | 11/2016 |
| CN | 206461019 U | 9/2017 |
| CN | 206471426 U | 9/2017 |
| CN | 209328958 U | 8/2019 |
| CN | 110247058 A | 9/2019 |
| CN | 110459705 A | 11/2019 |
| CN | 110476273 A | 11/2019 |
| CN | 209912959 U | 1/2020 |
| CN | 111446386 A | 7/2020 |
| CN | 111668534 A | 9/2020 |
| CN | 111886717 A | 11/2020 |
| EP | 2677592 A1 | 12/2013 |
| EP | 2 728 647 A1 | 5/2014 |
| EP | 2 876 338 A1 | 5/2015 |
| GB | 2564870 A | 1/2019 |
| JP | 60-29180 Y2 | 9/1985 |
| JP | 1-122560 A | 5/1989 |
| JP | 6-124696 A | 5/1994 |
| JP | 7-201309 A | 8/1995 |
| JP | 8-102313 A | 4/1996 |
| JP | 10-83833 A | 3/1998 |
| JP | 10-106532 A | 4/1998 |
| JP | 10-214609 A | 8/1998 |
| JP | 11-297301 A | 10/1999 |
| JP | 2955135 B2 | 10/1999 |
| JP | 11-329398 A | 11/1999 |
| JP | 2001-28274 A | 1/2001 |
| JP | 2001-52756 A | 2/2001 |
| JP | 2001-160387 A | 6/2001 |
| JP | 2001-256954 A | 9/2001 |
| JP | 2002-50338 A | 2/2002 |
| JP | 3252846 B2 | 2/2002 |
| JP | 2002-289170 A | 10/2002 |
| JP | 2004-14173 A | 1/2004 |
| JP | 2004-139777 A | 5/2004 |
| JP | 3632586 B2 | 3/2005 |
| JP | 2005-276840 A | 10/2005 |
| JP | 3718872 B2 | 11/2005 |
| JP | 2005-332816 A | 12/2005 |
| JP | 3751782 B2 | 3/2006 |
| JP | 2006-120606 A | 5/2006 |
| JP | 2006-278016 A | 10/2006 |
| JP | 2008-243811 A | 10/2008 |

(56) References Cited

FOREIGN PATENT DOCUMENTS

| | | |
|---|---|---|
| JP | 4346637 B2 | 10/2009 |
| JP | 4356209 B2 | 11/2009 |
| JP | 4401634 B2 | 1/2010 |
| JP | 4430587 B2 | 3/2010 |
| JP | 2011-258550 A | 12/2011 |
| JP | 5019557 B2 | 9/2012 |
| JP | 2012-190739 A | 10/2012 |
| JP | 5051410 B2 | 10/2012 |
| JP | 5651536 B2 | 1/2015 |
| JP | 2015-106613 A | 6/2015 |
| JP | 5877724 B2 | 3/2016 |
| JP | 5935878 B2 | 6/2016 |
| JP | 2016-225014 A | 12/2016 |
| JP | 2018-092776 A | 6/2018 |
| JP | 6406838 B2 | 10/2018 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| KR | 2001-0017098 A | 3/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-0612236 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-2014-0082270 A | 7/2014 |
| KR | 10-1446151 B1 | 10/2014 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0039214 A | 4/2020 |
| KR | 10-2020-0041625 A | 4/2020 |
| KR | 10-2177485 B1 | 11/2020 |
| KR | 10-2021-0006203 A | 1/2021 |
| WO | WO 2010/146154 A2 | 12/2010 |
| WO | WO 2012/090599 A1 | 7/2012 |
| WO | WO 2013/001821 A1 | 1/2013 |
| WO | WO2020159071 A1 † | 8/2020 |

OTHER PUBLICATIONS

European Search Report mailed in EP 22152223 on Jul. 29, 2022 (10 pages).
European Search Report mailed in EP 22152237 on Aug. 2, 2022 (11 pages).
European Search Report mailed in EP 22152245 on Jul. 28, 2022 (11 pages).
European Search Report mailed in EP 22152250 on Aug. 5, 2022 (12 pages).
International Search Report (PCT/ISA/210) issued in PCT/KR2022/010561, dated Nov. 16, 2022.
U.S. Office Action for U.S. Appl. No. 17/592,597, dated Jun. 21, 2023.
U.S. Office Action for U.S. Appl. No. 18/132,085, dated Jun. 14, 2023.
Third Party Observation for European Application No. 22881172.5, dated Jul. 22, 2024.
Third Party Observation for European Application No. 22881172.5, dated Jul. 25, 2024.

\* cited by examiner
† cited by third party

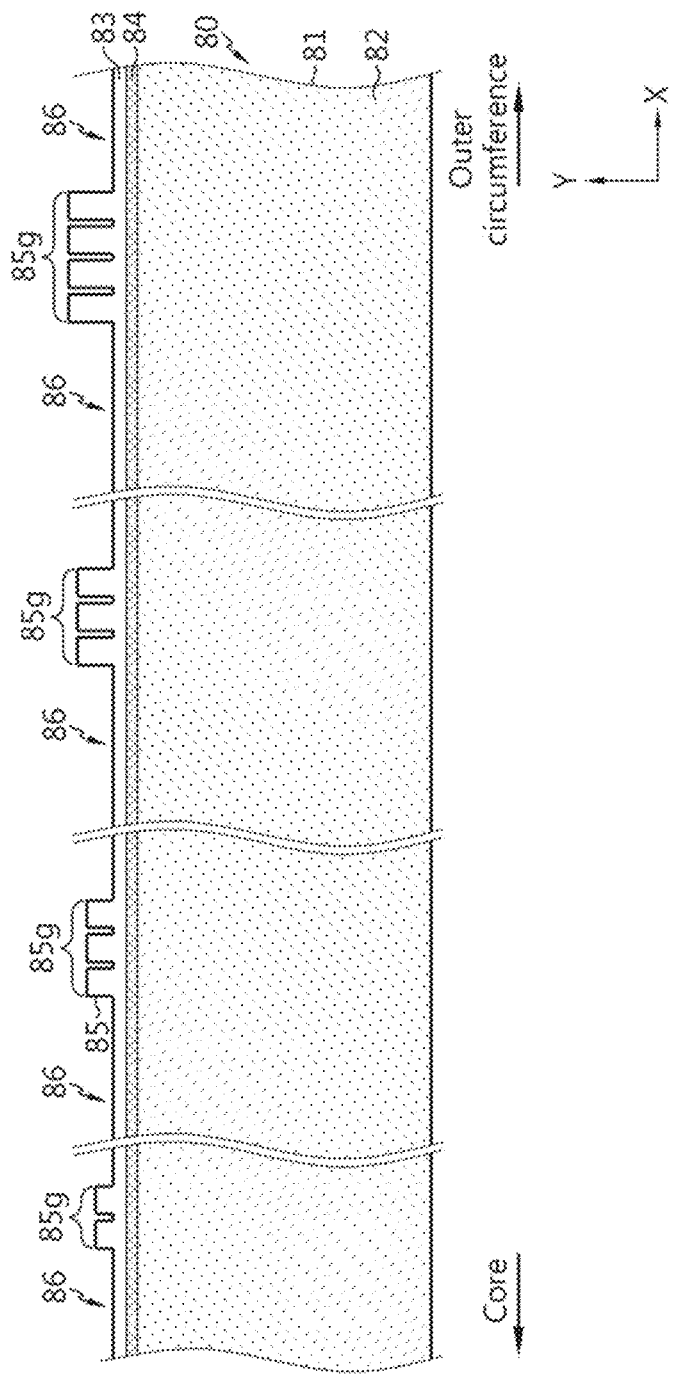

BATTERY, CURRENT COLLECTOR PLATE APPLIED THERETO, AND BATTERY PACK AND VEHICLE COMPRISING THE SAME

TECHNICAL FIELD

The present disclosure relates to a battery, a current collector plate applied thereto, and a battery pack and a vehicle comprising the same. More particularly, the present disclosure relates to, a battery having a structure for preventing force concentration at a welded part between components when external impacts or vibrations are applied while in use, a current collector plate applied thereto, and a battery pack and a vehicle comprising the same.

The present application claims priority to Korean Patent Application No. 10-2021-0137001 filed in the Republic of Korea on Oct. 14, 2021, Korean Patent Application No. 10-2021-0178999 filed in the Republic of Korea on Dec. 14, 2021, and Korean Patent Application No. 10-2021-0194611 filed in the Republic of Korea on Dec. 31, 2021, the disclosures of which are incorporated herein by reference.

BACKGROUND ART

Batteries that can be repeatedly recharged have a wide range of applications. Battery packs applied to, for example, devices such as electric vehicles require high capacity and high output. A battery pack having high capacity and high output may include a plurality of batteries.

The battery having high capacity and high output characteristics has an electrode tab over two end surfaces of a jelly roll to increase the current collection efficiency, and a current collector plate may be coupled to each of the two end surfaces of the jelly roll. This structure may maximize the contact area of the electrode tab and the current collector plate and minimize the resistance at the connected part of the components.

As described above, when batteries are applied to, for example, devices such as vehicles, external impacts and vibrations may be frequently applied while in use, causing damage to a coupled part for electrical connection between components. The damaged coupled part causes product defects.

Alternatively, even though the electrical connection is not completely disconnected by the damaged coupled part for electrical connection, when a portion of the welded part is damaged and the coupling area between components reduces, the increased resistance may result in excessive heat generation or component deformation, causing an internal short.

Accordingly, there is a need for the development of batteries having a structure for preventing force concentration at the coupled part between components when external impacts and/or vibrations are applied while in use.

There is a conventional flexible current collector plate having a flat plate shape that deforms in the axial direction of the battery. However, each time the flat plate shaped-current collector plate deforms in the axial direction, torsion stress is applied to the joined (welded) part of the current collector plate, causing a disconnection at the contact point of the current collector plate.

DISCLOSURE

Technical Problem

The present disclosure is designed to address the above-described problem, and therefore the present disclosure is directed to proving a battery for the dissipation of external impacts and/or vibrations without concentration on a specific location when the impacts and/or vibrations are applied while in use, thereby preventing damage from occurring at a coupled part between components.

The present disclosure is further directed to proving a current collector plate having a structure that keeps it flat and provides flexibility in the axial direction and the radial direction, thereby eliminating the risk of torsion stress at a contact point when deformation occurs.

The present disclosure is further directed to proving a current collector plate that can perform a current interrupt function without additionally installing a current interrupt member to interrupt an electric current quickly when an overcurrent occurs due to a short circuit, thereby ensuring safety of a battery while in use.

The objectives of the present disclosure are not limited to the above-mentioned objectives, and these and other objectives and advantages of the present disclosure may be understood by the following description, and will be understood more clearly by an embodiment of the present disclosure. Additionally, it is apparent that the objectives and advantages of the present disclosure may be realized by the means set forth in the appended claims and a combination thereof.

Technical Solution

The present disclosure provides a current collector plate.

The current collector plate includes an edge portion extended in a circumferential direction; at least one tab coupling portion extending radially inwardly from the edge portion and configured to be coupled to a first electrode tab, and a terminal coupling portion disposed radially inwardly of the edge portion.

Among the terminal coupling portion, the edge portion and the at least one tab coupling portion, the edge portion may be disposed at an outermost radial position, and the terminal coupling portion may be disposed at an innermost at least one position.

A center of the terminal coupling portion may substantially aligns with a center of the edge portion.

The edge portion may have a rim shape.

The edge portion may have a substantially circular flat ring shape.

The at least one tab coupling portion may be a plurality of tab coupling portions arranged along the circumferential direction of the edge portion.

Each of the plurality of tab coupling portions may have a same length.

The plurality of tab coupling portions may be arranged at equal intervals along the circumferential direction of the edge portion.

The tab coupling portion may extend radially inward from the inner circumference of the edge portion.

On the basis of an imaginary line connecting connected parts of the two adjacent tab coupling portions in the circumferential direction and the edge portion in a straight line shape, the edge portion between the two adjacent tab coupling portions may be disposed radially outwardly of the imaginary line.

The terminal coupling portion may be connected to the edge portion between two adjacent tab coupling portions in the circumferential direction of the edge portion.

The terminal coupling portion may be disposed at a center of the edge portion, and the edge portion and the terminal coupling portion may be connected by a connection portion.

The connection portion may be extended more outwards in the radial direction than the tab coupling portion.

The terminal coupling portion may be surrounded by the plurality of tab coupling portions.

The plurality of tab coupling portions may be spaced apart from the terminal coupling portion in the radial direction, and may be radially arranged around the terminal coupling portion.

The connection portion may be linearly extended in the shape of a straight line to connect the terminal coupling portion to the edge portion.

The connection portion may have a straight line shape that passes through the center of the current collector plate.

The connection portion may be extended from the terminal coupling portion in the radial direction and connected to the edge portion.

The connection portion may be substantially extended from the center of the terminal coupling portion in the radial direction and connected to the edge portion.

A plurality of the connection portions may be provided and arranged at equal intervals along an outer circumference of the terminal coupling portion.

The plurality of connection portions may be arranged at equal intervals along the circumferential direction of the edge portion.

The at least one tab coupling portion may be a pair of tab coupling portions and the connection portion may be disposed between the pair of adjacent tab coupling portions in the circumferential direction of the edge portion.

A distance from the connection portion to a first tab coupling portion of the pair of tab coupling portions along the circumferential direction may correspond to a distance from the connection portion to a second tab coupling portion of the pair of tab coupling portions along the circumferential direction of the edge portion.

The electrical conduction pathway from the terminal coupling portion to the tab coupling portion may be in an order of the terminal coupling portion, the connection portion, the edge portion and the at least one tab coupling portion.

At least part of the connection portion may have a smaller width than the at least one tab coupling portion.

The connection portion may include a tapered portion having a gradual reduction in width along a direction from the inner circumferential surface of the edge portion toward the terminal coupling portion.

The connection portion may include a notching portion having a local reduction in cross sectional area.

The notching portion may be disposed closer to the edge portion than the terminal coupling portion.

A part of the at least one tab coupling portion facing the terminal coupling portion may have a tapered shape toward the terminal coupling portion.

The current collector plate may have a radially symmetric structure.

The current collector plate may have the radially symmetric structure by 90°, 120° or 180° rotation.

The current collector plate may be used in a battery.

The battery including the current collector plate may include an electrode assembly and a battery housing accommodating the electrode assembly.

The electrode assembly may include a first electrode and a second electrode and a separator interposed therebetween wound together around a winding axis to define a core and an outer circumferential surface, wherein the first electrode and the second electrode have a first electrode tab formed of a first uncoated portion and a second electrode tab formed of a second uncoated portion at a long side end along a winding direction, respectively, and the second electrode tab and the second electrode tab protrude from the separator in opposite directions along the winding axis direction.

The battery may include a terminal installed to be insulated from the battery housing and exposed outside of the battery housing.

The current collector plate may include an edge portion which defines a space inside; a tab coupling portion extended from the edge portion in the centripetal direction and coupled to the first electrode tab; and a terminal coupling portion disposed radially inward of the edge portion; and a connection portion connecting the terminal coupling portion to the edge portion.

The first electrode tab may be coupled to the tab coupling portion of the current collector plate, and the terminal may be coupled to the terminal coupling portion of the current collector plate.

The first electrode tab may be separated by cutout grooves along the winding direction, and may include a plurality of segments that protrudes from the separator along the winding axis direction.

The plurality of segments may be arranged to be overlapped along the radial direction of the electrode assembly so as to form a plurality of segment alignments spaced apart from each other in a circumferential direction of the electrode assembly.

Segments included in each segment alignment may be bent along the radial direction to form a bent surface region.

The tab coupling portion of the current collector plate may be coupled to the bent surface region, and the connection portion may be positioned between segment alignments spaced apart from each other in the circumferential direction of the electrode assembly.

The connection portion may include a notching portion having a reduction in cross sectional area, and the notching portion may be spaced apart from an end surface of the electrode assembly between the segment alignments spaced apart from each other in the circumferential direction.

The end surface of the electrode assembly between the segment alignments spaced apart from each other in the circumferential direction may be an electrolyte impregnation portion.

In the electrolyte impregnation portion, an end of the first electrode and an end of the second electrode in the winding axis direction may be exposed between the separator of an adjacent winding turn.

The battery housing may have a closed portion on one side in the winding axis direction and an open portion on the other side.

The electrode assembly including the first electrode tab and the second electrode tab may be inserted through the open portion.

The first electrode tab and the second electrode tab of the electrode assembly may be positioned on one side and the other side in the axial direction respectively.

When the electrode assembly is received in the battery housing, the first electrode tab may face the closed portion, and the second electrode tab may face the open portion.

The terminal may be disposed at the closed portion.

The terminal may pass through the closed portion.

The second electrode tab may be electrically connected to the battery housing.

The terminal coupling portion of the current collector plate may be aligned with a hole at a winding center of the electrode assembly.

The end of the first electrode tab may be bent in a radial direction.

The first electrode tab may be bent in the centripetal direction or the centrifugal direction.

The tab coupling portion of the current collector plate may be coupled to the surface of the bent first electrode tab.

The connection portion may face and contact the surface of the bent first electrode tab.

The edge portion may face and contact the surface of the bent first electrode tab.

The open portion of the battery housing may be closed by the cap plate.

The cap plate may not be electrically connected to the first electrode tab and the second electrode tab of the electrode assembly. Accordingly, the cap plate may be non-polar.

An insulator may be positioned between the closed portion and the current collector plate.

The terminal may be coupled to the terminal coupling portion of the current collector plate through the insulator.

A battery pack may include a plurality of batteries and a pack housing accommodating the batteries.

The battery pack may be mounted in a vehicle.

Advantageous Effects

According to an aspect of the present disclosure, it is possible to dissipate external impacts and/or vibrations without concentration on a specific location when the impacts and/or vibrations are applied while the battery is in use, thereby preventing damage from occurring at a coupled part between components.

Meanwhile, according to another aspect of the present disclosure, the current collector plate itself can perform a current interrupt function without additionally installing a current interrupt member to interrupt an electric current quickly when an overcurrent occurs due to a short circuit, thereby ensuring safety of the battery while in use.

Additionally, according to another aspect of the present disclosure, since the connection pathway from the terminal coupling portion to the tab coupling portion of the current collector plate starts from the terminal coupling portion, goes through the connection portion extended more outwards in the radial direction than the tab coupling portion and the edge portion extended in the circumferential direction, and comes back to the tab coupling portion extended inwards in the radial direction again, the shape of the current collector plate covers the entire electrode tab of the electrode assembly to flexibly respond to impacts and vibration and prevent the current collector plate from moving up and down, allowing the current collector plate to keep pressing down the electrode tabs of the electrode assembly, thereby preventing deformation of the electrode tab caused by deformation of the current collector plate.

Additionally, according to the present disclosure, even though the terminal coupling portion and the tab coupling portion are relatively subjected to an external force or vibration in the axial direction or the radial direction, since the connection portion is linearly extended in the radial direction, it is possible to prevent torsion stress from acting on the coupled part of the terminal coupling portion and the tab coupling portion, thereby preventing separation at the coupled part.

However, the technical effect that can be obtained through the present disclosure is not limited to the above-described effect, and these and other effects will be clearly understood by those skilled in the art from the following description.

These and other effects of the present disclosure will be described together with the detailed description of the embodiments of the present disclosure.

DESCRIPTION OF DRAWINGS

FIG. 19*a* is a plane view showing an electrode structure according to another embodiment of the present disclosure.

BEST MODE

Figure 1:
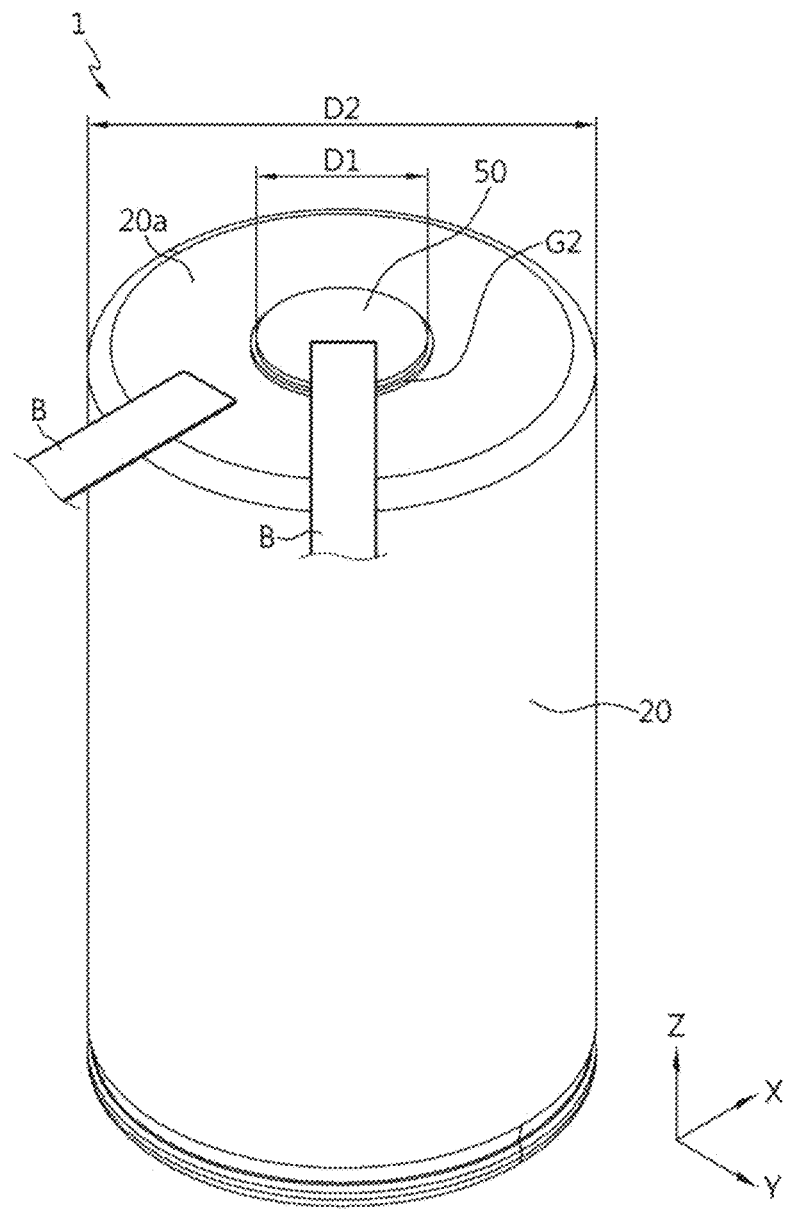
FIG. 1 is a perspective view showing a battery according to an embodiment of the present disclosure and a busbar for electrical connection of a plurality of batteries.

The above-described objectives, features and advantages will be described in detail with reference to the accompanying drawings, and accordingly, those skilled in the art will easily practice the technical aspect of the present disclosure. In describing the present disclosure, when it is determined that a certain detailed description of relevant known technology may make the subject matter of the present disclosure unnecessarily obscure, the detailed description is omitted. Hereinafter, an exemplary embodiment according to the present disclosure will be described in detail with reference to the accompanying drawings. In the drawings, identical reference numerals are used to indicate identical or similar elements.

The terms "first", "second" and the like are used to describe various elements, and these elements are not limited by the terms. These terms are used to distinguish one element from another, and unless the context clearly indicates otherwise, a first element may be a second element.

In the specification, unless the context clearly indicates otherwise, each element may be singular or plural.

Hereinafter, it will be understood that an element is referred to as being "above (or under)" or "on (or below)" another, it can be on an upper surface (or a lower surface) of the other element and intervening elements may be present between the element and the other element on (or below) the element.

Additionally, it will be further understood that when an element is referred to as being "connected to", "coupled to" or "joined to" another element, it can be directly connected or joined to the other element, or intervening elements may be present, or each element may be "connected to", "coupled to" or "joined to" each other through another element.

As used herein, the singular forms include the plural forms as well unless the context clearly indicates otherwise. It should be interpreted that the terms "comprises" or "comprising", when used in this specification, specifies the presence of stated elements or steps, but does not preclude the presence or addition of one or more other elements or steps.

Additionally, the singular forms as used herein include the plural forms as well unless the context clearly indicates otherwise. It should be interpreted that the terms "comprises" or "comprising", when used in this specification, specifies the presence of stated elements or steps, but does not preclude the presence or addition of one or more other elements or steps.

In the specification, unless the context clearly indicates otherwise, "A and/or B" represents either A or B or both, and "C to D" represents C or more and D or less.

In describing an embodiment below, a hightwise direction in which a battery is extended is referred to as a heightwise direction or an axial direction Z, and a direction around the axial direction is referred to as a circumferential direction. Here, a direction in which an open portion is formed in the heightwise direction of the battery is referred to as a downward direction, and a direction in which a closed portion is formed is referred to as an upward direction.

Furthermore, a direction extended in a radial direction from the center of the battery is referred to as a radial direction X, Y, and a direction that faces outwards in the radial direction is referred to as a centrifugal direction and a direction that faces inwards in the radial direction is referred to as a centripetal direction.

Referring to FIGS. 1 to 4, a battery 1 according to the present disclosure includes an electrode assembly 10 and a cylindrical battery housing 20 accommodating the electrode assembly 10.

The battery housing 20 has a closed portion on top (one end in the axial direction) and an open portion on bottom (the other end in the axial direction).

A terminal 50 is installed at the center of the closed portion.

The open portion is closed by a cap plate 30.

The electrode assembly 10 includes a first electrode tab 11 and a second electrode tab 12.

The first electrode tab 11 is electrically connected to the terminal 50, and the second electrode tab 12 is electrically connected to the battery housing 20.

The terminal 50 and the battery housing 20 are insulated from each other.

The present disclosure provides a current collector plate 40 between the first electrode tab 11 of the electrode assembly 10 and the terminal 50 to electrically connect them.

The current collector plate 40 may be positioned between the closed portion of the battery housing 20 and the electrode assembly 10.

Referring to FIGS. 5 to 10, the current collector plate 40 includes: an edge portion 41 extended in the circumferential direction to define a space inside: a tab coupling portion 42 extended from the edge portion 41 in the centripetal direction and coupled to the first electrode tab 11; and a terminal coupling portion 43 disposed at the centripetal position relative to the edge portion 41, spaced apart from the tab coupling portion 42, and connected to the tab coupling portion 42 through the edge portion 41.

Among the terminal coupling portion 43, the edge portion 41 and the tab coupling portion 42, the edge portion 41 may be disposed at the outermost centrifugal position and the terminal coupling portion 43 may be disposed at the innermost centripetal position.

The edge portion 41 may have a rim shape having a central hollow.

The edge portion 41 may have a substantially circular flat ring shape.

A plurality of tab coupling portions 42 may be arranged along the circumferential direction of the edge portion 41.

The extended length of each of the plurality of tab coupling portions 42 may correspond to each other.

The plurality of tab coupling portions 42 may be arranged at equal intervals along the circumferential direction of the edge portion 41.

The tab coupling portion 42 may be extended from the inner circumference of the edge portion 41 in the centripetal direction.

A part of the tab coupling portion 42 facing the terminal coupling portion 43 may have a tapered shape toward the terminal coupling portion 43. The tapered shape increases the open area of the current collector plate 40 by reducing the unnecessary area of the tab coupling portion 42.

Figure 8:
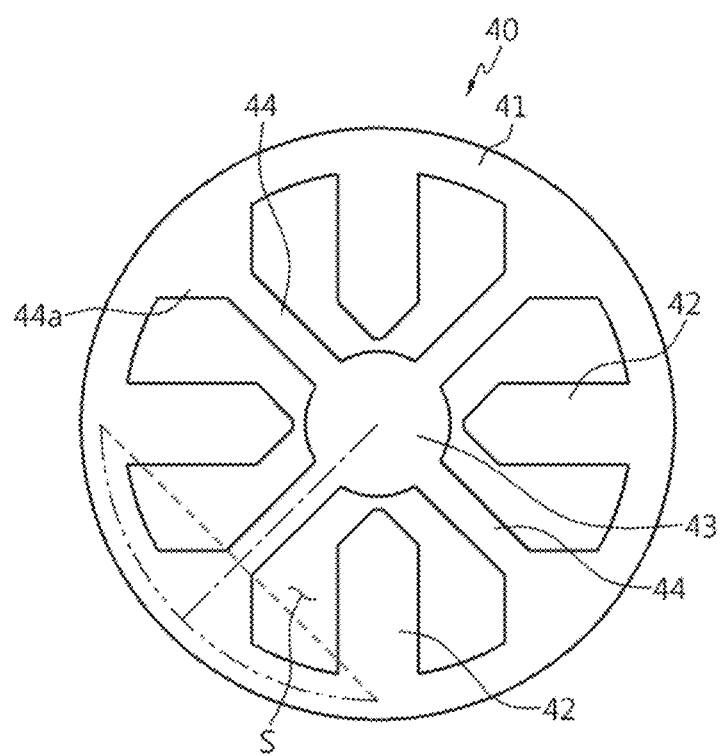

On the basis of an imaginary line (see the dashed line in FIG. 8) connecting the connected parts of two adjacent tab coupling portions 42 in the circumferential direction and the edge portion 41 in the shape of a straight line, the edge portion 41 (see the double dashed line in FIG. 8) between the two adjacent tab coupling portions 42 may be disposed at the more centrifugal position than the imaginary line (see the dashed line in FIG. 8).

The terminal coupling portion 43 may be connected to the edge portion 41 between the two adjacent tab coupling portions 42 in the circumferential direction.

The terminal coupling portion 43 may be disposed at or near the center of the centripetal area relative to the edge portion 41, and the edge portion 41 and the terminal coupling portion 43 may be connected by a connection portion 44.

The connection portion 44 may be extended more outwards in the radial direction than the imaginary line (see the dashed line in FIG. 8) connecting the connection portions of the two adjacent tab coupling portions 42 in the circumferential direction and the edge portion 41 in the shape of a straight line (see the single dashed line in FIG. 8).

The terminal coupling portion 43 may be surrounded by the plurality of tab coupling portions 42.

The plurality of tab coupling portions 42 may be spaced apart from the terminal coupling portion 43 in the radial direction, and may be radially arranged around the terminal coupling portion 43.

The connection portion 44 may be linearly extended in the shape of a straight line to connect the terminal coupling portion 43 to the edge portion 41.

The connection portion 44 may have a straight line shape that passes through the center of the current collector plate 40.

The connection portion 44 may be extended from the terminal coupling portion 43 in the radial direction and connected to the edge portion 41.

The connection portion 44 may be substantially extended from the center of the terminal coupling portion 43 in the radial direction and connected to the edge portion 41.

A plurality of connection portions 44 may be provided, and may be arranged at equal intervals along the outer circumference of the terminal coupling portion 43.

The plurality of connection portions 44 may be arranged at equal intervals along the circumferential direction of the edge portion 41.

The connection portion 44 may be disposed between a pair of tab coupling portions 42 adjacent to each other in the circumferential direction.

The connection portion 44 is extended through a space between the edge portion 41 and the terminal coupling portion 43 while avoiding the tab coupling portion 42 to electrically connect the edge portion 41 to the terminal coupling portion 43.

The distance from the connection portion 44 to any one of the pair of tab coupling portions 42 along the circumferential direction may correspond to the distance from the connection portion 44 to the other one of the pair of tab coupling portions 42 along the circumferential direction.

The current collector plate 40 may have a radially symmetric structure. The radially symmetric structure refers to a symmetrical structure in which the shape of a target for measuring symmetry matches when the target is rotated at a predetermined angle. Preferably, the current collector plate 40 may have the radially symmetric structure by 90°, 120° or 180° rotation. In an example, when the current collector plate 40 is rotated 90°, the structure may match. However, the present disclosure is not limited by the angle of rotation of the radially symmetric structure.

The electrical conduction pathway from the terminal coupling portion 43 to the tab coupling portion 42 may be in an order of the terminal coupling portion 43, the connection portion 44, the edge portion 41 and the tab coupling portion 42.

At least part along the extension direction of the connection portion 44 may have a smaller width than the tab coupling portion 42.

When the terminal coupling portion 43 is subjected to a force in the radial direction and/or the axial direction relative to the tab coupling portion 42, the edge portion 41 and/or the connection portion 44 between the two adjacent tab coupling portions 42 may absorb the force as it deforms. In this instance, torsion stress does not occur at the coupled part of the terminal coupling portion 43 and the tab coupling portion 42.

The connection portion 44 may include a tapered portion 44a having a gradual reduction in width along a direction from the inner circumferential surface of the edge portion 41 toward the terminal coupling portion 43.

Figure 9:
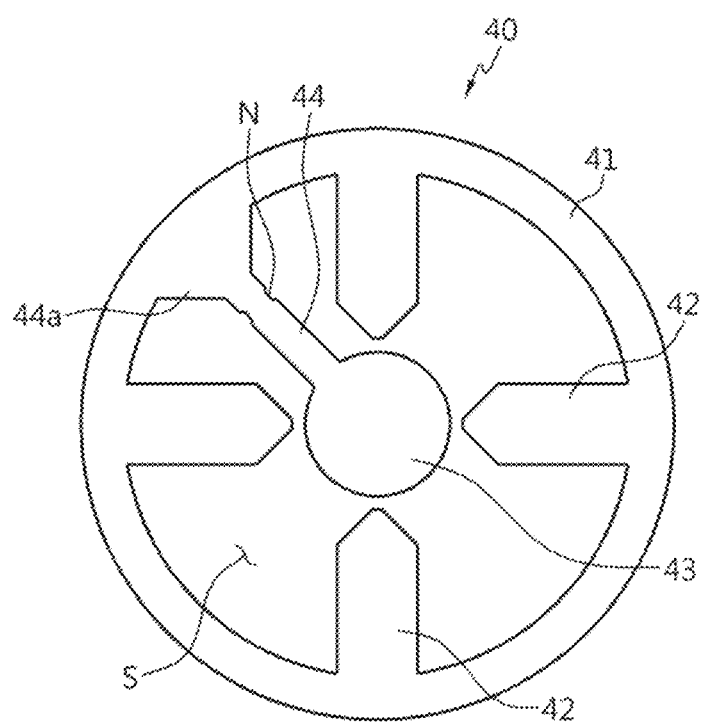
FIGS. 9 and 10 are diagrams showing various shapes of a current collector plate (a first current collector plate) according to another embodiment of the present disclosure.
Figure 10:
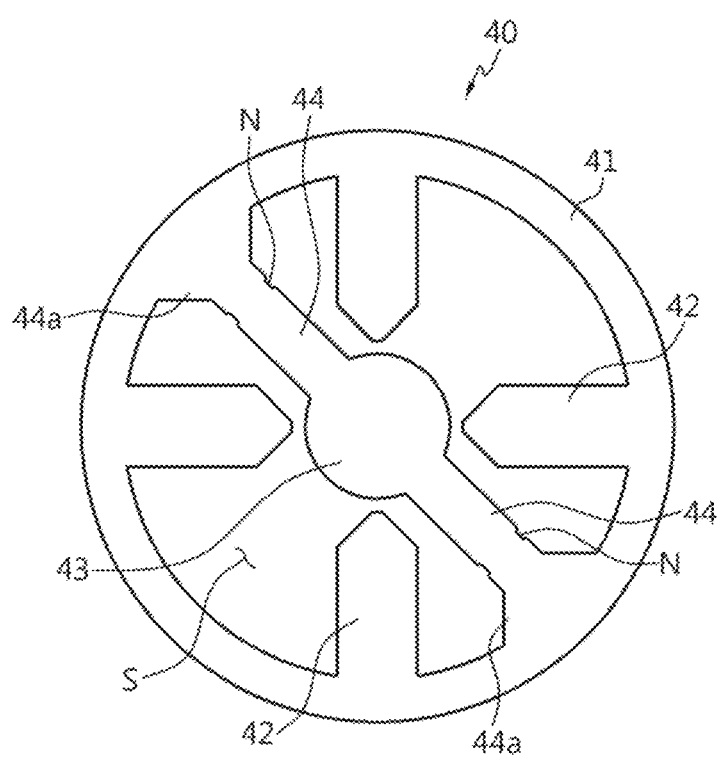

Referring to FIGS. 9 and 10, the connection portion 44 may include a notching portion N having a local reduction in cross sectional area along the extension direction.

The notching portion N may be disposed closer to the edge portion 41 than the terminal coupling portion 43.

Referring back to FIGS. 1 to 4, the current collector plate 40 may be used in the battery 1.

The battery 1 including the current collector plate 40 may include the battery housing 20 accommodating the electrode assembly 10.

The battery housing 20 may have the closed portion on one side in the axial direction and the open portion on the other side.

The electrode assembly 10 including the first electrode tab 11 and the second electrode tab 12 may be inserted through the open portion.

The first electrode tab 11 and the second electrode tab 12 of the electrode assembly 10 may be positioned on one side and the other side in the axial direction respectively.

When the electrode assembly 10 is received in the battery housing 20, the first electrode tab 11 may face the closed portion, and the second electrode tab 12 may face the open portion.

The terminal 50 may be disposed at the closed portion.

The terminal 50 may pass through the closed portion.

The first electrode tab 11 may be electrically connected to the terminal 50.

The first electrode tab 11 and the terminal 50 may be electrically connected through the current collector plate 40.

The first electrode tab 11 may be coupled to the tab coupling portion 42 of the current collector plate 40, and the terminal 50 may be coupled to the terminal coupling portion 43 of the current collector plate 40.

The second electrode tab 12 may be electrically connected to the battery housing 20.

The terminal coupling portion 43 of the current collector plate 40 may be disposed at a position corresponding to a hole at the winding center C of the electrode assembly 10.

Figure 4:
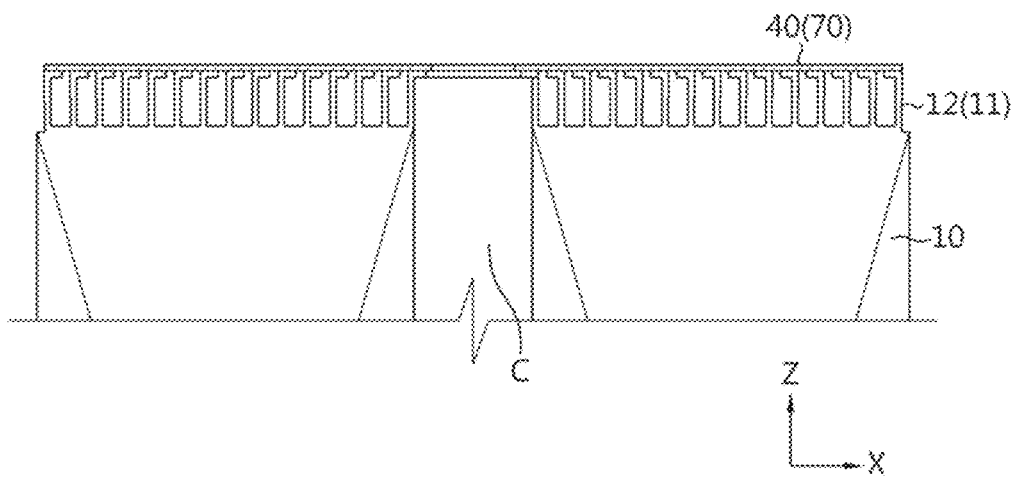
FIG. 4 is a diagram showing an electrode assembly and a current collector plate (a first current collector plate) of the present disclosure coupled to each other.

As shown in FIG. 4, the end of the first electrode tab 11 may be bent in the radial direction.

The first electrode tab 11 may be bent in the centripetal direction or the centrifugal direction.

The tab coupling portion 42 of the current collector plate 40 may be coupled to the surface of the bent first electrode tab 11.

The connection portion 44 may face and contact the surface of the bent first electrode tab 11.

The edge portion 41 may face and contact the surface of the bent first electrode tab 11.

The open portion of the battery housing 20 may be closed by the cap plate 30.

The cap plate 30 may not be electrically connected to the first electrode tab 11 and the second electrode tab 12 of the electrode assembly 10. Accordingly, the cap plate 30 may be non-polar.

An insulator 60 may be positioned between the closed portion and the current collector plate 40.

The terminal 50 may be coupled to the terminal coupling portion 43 of the current collector plate 40 through the insulator 60.

Figure 20:
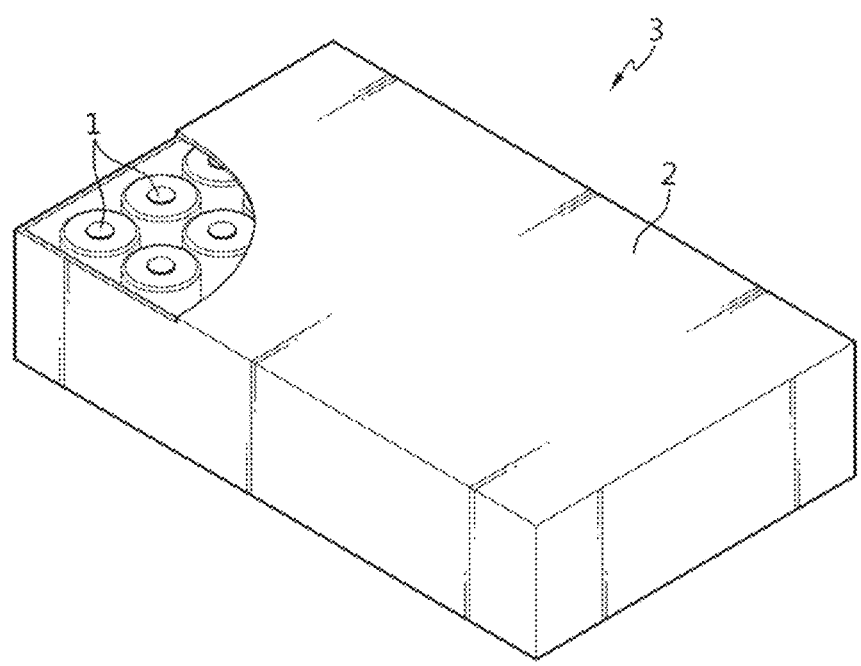
FIG. 20 is a schematic diagram showing a battery pack according to an embodiment of the present disclosure.

As shown in FIG. 20, a battery pack 3 may include a plurality of batteries 1 and a pack housing 2 accommodating the batteries 1.

Figure 21:
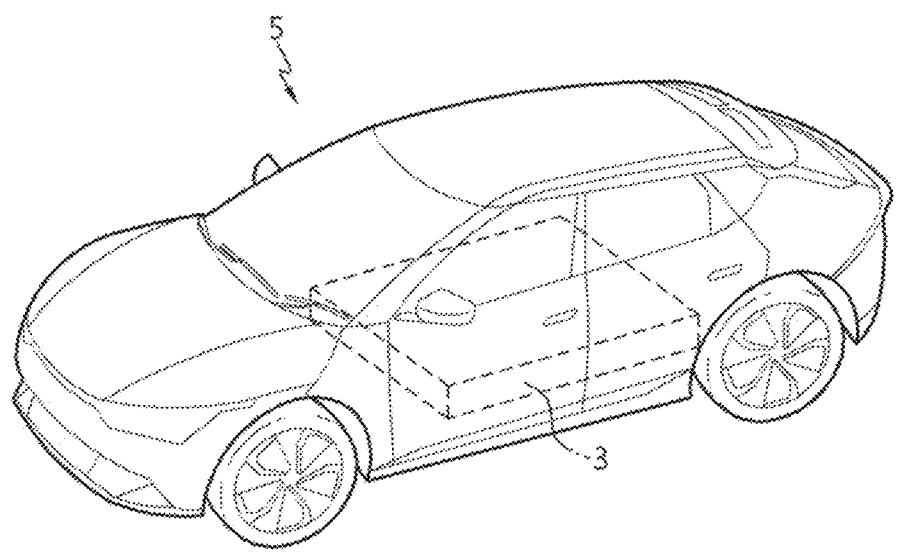
FIG. 21 is a diagram showing a vehicle according to an embodiment of the present disclosure.

Additionally, as shown in FIG. 21, the battery pack 3 may be mounted in a vehicle 5.

Referring back to FIGS. 1 and 2, the battery 1 according to an embodiment of the present disclosure includes the electrode assembly 10, the battery housing 20, the cap plate 30, the current collector (the first current collector) 40 and the terminal 50. In addition to the above-described components, the battery 1 may further include a sealing gasket G1 and/or an insulation gasket G2 and/or the insulator 60 and/or a second current collector plate 70.

The electrode assembly 10 includes a first electrode having a first polarity, a second electrode having a second polarity and a separator between the first electrode and the second electrode. The first electrode corresponds to a positive or negative electrode, and the second electrode corresponds to an electrode having the opposite polarity to the first electrode.

The electrode assembly 10 may have, for example, a jelly-roll shape. That is, the electrode assembly 10 may be made by winding a stack around the winding center C, the stack formed by stacking the first electrode, the separator and the second electrode at least once in a sequential order. In this case, there may be an additional separator on the outer circumferential surface of the electrode assembly 10 for the insulation from the battery housing 20.

The first electrode includes a first electrode current collector and a first electrode active material layer coated on one or two surfaces of the first electrode current collector. The first electrode current collector has an uncoated portion not coated with the first electrode active material at one end in the widthwise direction (parallel to the Z axis). The uncoated portion acts as the first electrode tab 11. The first electrode tab 11 is positioned at the upper part in the heightwise direction (parallel to the Z axis) of the electrode assembly 10 received in the battery housing 20.

The second electrode includes a second electrode current collector and a second electrode active material layer coated on one or two surfaces of the second electrode current collector. The second electrode current collector has an uncoated portion not coated with the second electrode active material at the other end in the widthwise direction (parallel to the Z axis). The uncoated portion acts as the second electrode tab 12. The second electrode tab 12 is positioned at the lower part in the heightwise direction (parallel to the Z axis) of the electrode assembly 10 received in the battery housing 20.

That is, the first electrode tab 11 and the second electrode tab 12 are extended in opposite directions along the widthwise direction of the electrode assembly 10, i.e., the heightwise direction of the battery 1 (parallel to the Z axis). The first electrode tab 11 is extended toward the closed portion of the battery housing 20, and the second electrode tab 12 is extended toward the open portion of the battery housing 20.

In the present disclosure, the positive electrode active material coated on the positive electrode plate and the negative electrode active material coated on the negative electrode plate may include any type of active material known in the technical field.

In an example, the positive electrode active material may include an alkali metal compound represented by formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru, and Cr; $x\geq0$, $1\leq x+y\leq2$, $-0.1\leq z\leq2$; the stoichiometric coefficients x, y and z are selected to keep the compound electrically neutral).

In another example, the positive electrode active material may be an alkali metal compound $xLiM^1O_2\text{-}(1-x)Li_2M^2O_3$ ($M^1$ includes at least one element having an average trivalent oxidation state: $M^2$ includes at least one element having an average tetravalent oxidation state: $0\leq x\leq1$) disclosed by U.S. Pat. Nos. 6,677,082 and 6,680,143.

In still another example, the positive electrode active material may be lithium metal phosphate represented by formula $Li_aM^1{}_xFe_{1-x}M^2{}_yP_{1-y}M^3{}_zO_{4-z}$ ($M^1$ includes at least one selected from Ti, Si, Mn, Co, Fe, V, Cr, Mo, Ni, Nd, Al, Mg and Al; $M^2$ includes at least one selected from Ti, Si, Mn, Co, Fe, V, Cr, Mo, Ni, Nd, Al, Mg, Al, As, Sb, Si, Ge, V and S; $M^3$ includes a halogen group element optionally containing F: $0<a\leq2$, $0\leq x\leq1$, $0\leq y<1$, $0\leq z<1$; the stoichiometric coefficients a, x, y and z are selected to keep the compound electrically neutral) or $Li_3M_2(PO_4)_3$ [M includes at least one selected from Ti, Si, Mn, Fe, Co, V, Cr, Mo, Ni, Al, Mg and Al].

Preferably, the positive electrode active material may include primary particles and/or secondary particles formed by agglomeration of the primary particles.

In an example, the negative electrode active material may include a carbon material, a lithium metal or a lithium metal compound, silicon or a silicon compound, tin or a tin compound. Metal oxide having the potential of less than 2V such as $TiO_2$ and $SnO_2$ may be used for the negative electrode active material. The carbon material may include a low crystalline carbon, a high crystalline carbon or the like.

The separator may include, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, used singly or in stack. In another example, the separator may include a commonly used porous nonwoven fabric, for example, a nonwoven fabric made of high melting point glass fibers and polyethylene terephthalate fibers.

The separator may include a coating layer of inorganic particles on at least one surface. Additionally, the separator itself may be formed of a coating layer of inorganic particles. The particles that form the coating layer may be bonded with a binder such that there is interstitial volume between adjacent particles.

The inorganic particles may include inorganics having the dielectric constant of 5 or more. Non-limiting examples of the inorganic particles may include at least one material selected from the group consisting of $Pb(Zr, Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$ and $Y_2O_3$.

An electrolyte may be a salt having a structure of $A^+B^-$. Here, $A^+$ includes an alkali metal cation such as $Li^+$, $Na^+$, $K^+$ or a combination thereof. $B^-$ includes at least one anion selected from the group consisting of $F^-$, $Cl^-$, $Br^-$, $I^-$, $NO_3{}^-$, $N(CN)_2{}^-$, $BF_4{}^-$, $ClO_4{}^-$, $AlO_4{}^-$, $AlCl_4{}^-$, $PF_6{}^-$, $SbF_6{}^-$, $AsF_6{}^-$, $BF_2C_2O_4{}^-$, $BC_4O_8{}^-$, $(CF_3)_2PF_4{}^-$, $(CF_3)_3PF_3{}^-$, $(CF_3)_4PF_2{}^-$, $(CF_3)_5PF^-$, $(CF_3)_6P^-$, $CF_3SO_3{}^-$, $C_4F_9SO_3{}^-$, $CF_3CF_2SO_3{}^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3{}^-$, $CF_3CO_2{}^-$, $CH_3CO_2{}^-$, $SCN^-$ and $(CF_3CF_2SO_2)_2N^-$.

The electrolyte may be used by dissolving in an organic solvent. The organic solvent may include at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrolidone (NMP), ethyl methyl carbonate (EMC) or γ-butyrolactone.

The battery housing 20 is an approximately cylindrical container having the open portion on the bottom, and for example, is made of a material having conductive properties such as metal. The material of the battery housing 20 may be, for example, aluminum. The battery housing 20 has the open portion at the lower end of the height and the closed portion at the upper end. The battery housing 20 accommodates the electrode assembly 10 through the open portion on the bottom and also accommodates the electrolyte.

The battery housing 20 is electrically connected to the electrode assembly 10. For example, the battery housing 20 is electrically connected to the second electrode tab 12 of the electrode assembly 10. Accordingly, the battery housing 20 may have the same polarity as the second electrode tab 12.

Figure 2:
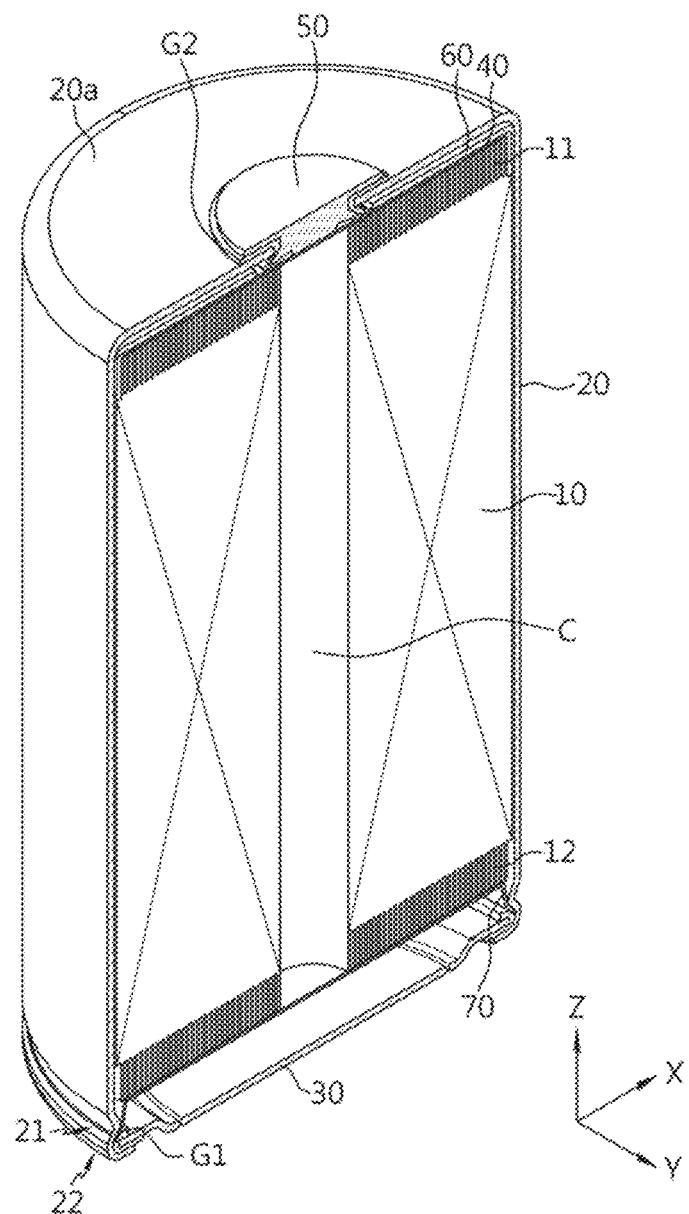
FIG. 2 is a cross-sectional view showing an upper part structure of a battery according to an embodiment of the present disclosure.
Figure 11:
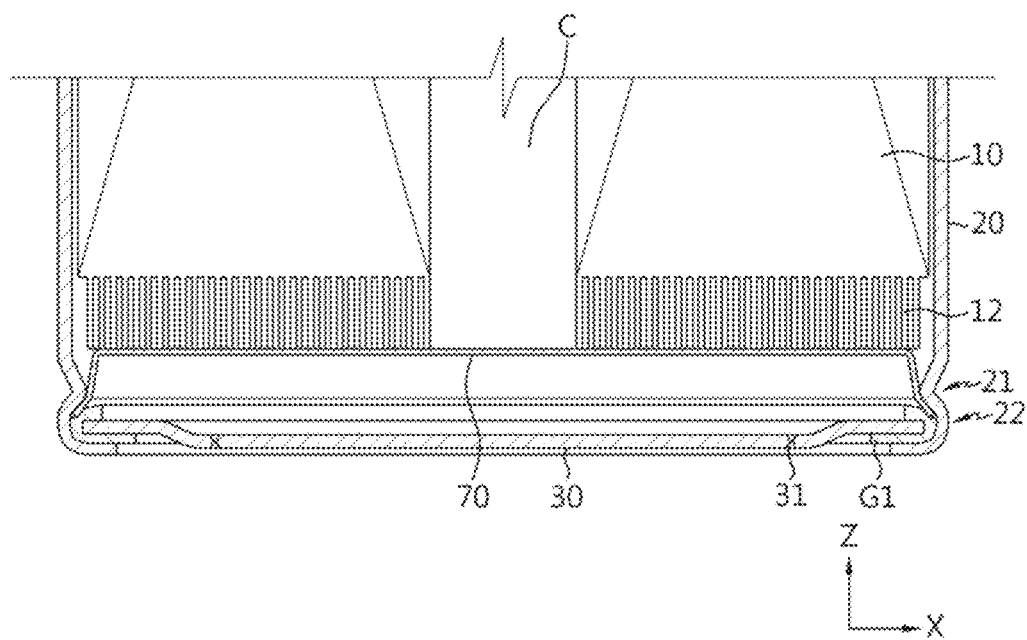
FIG. 11 is a partial cross-sectional view showing a lower part structure of a battery according to an embodiment of the present disclosure.

Referring to FIGS. 2 and 11, the battery housing 20 may include a beading portion 21 and a crimping portion 22 at the lower end. The beading portion 21 is disposed below the electrode assembly 10. The beading portion 21 is formed by pressing the outer circumferential surface of the battery housing 20 in the centripetal direction. The beading portion 21 may prevent the electrode assembly 10 having a size approximately corresponding to the width of the battery housing 20 from slipping through the open portion on the bottom of the battery housing 20, and may act as a support on which the cap plate 30 is seated.

The crimping portion 22 is disposed below the beading portion 21. The crimping portion 22 is extended and bent to surround the outer circumferential surface of the cap plate 30 below the beading portion 21 and part of the lower surface of the cap plate 30.

However, the present disclosure does not exclude that the battery housing 20 does not include the beading portion 21 and/or the crimping portion 22. In the present disclosure, when the battery housing 20 does not include the beading portion 21 and/or the crimping portion 22, the fixing of the electrode assembly 10 and/or the fixing of the cap plate 30 and/or the sealing of the battery housing 20 may be, for example, accomplished through additional application of a component that may act as a stopper for the electrode assembly 10 and/or additional application of a structure on which the cap plate 30 may be seated and/or welding between the battery housing 20 and the cap plate 30.

The area of the closed portion of the battery housing 20 that forms the upper surface may have the thickness ranging from approximately 0.5 mm to 1.0 mm, and more preferably from approximately 0.6 mm to 0.8 mm. The sidewall of the battery housing 20 that forms the outer circumferential surface may have the thickness ranging from approximately 0.3 mm to 0.8 mm, and more preferably from approximately 0.40 mm to 0.60 mm. According to an embodiment of the present disclosure, the battery housing 20 may have a plating layer. In this case, the plating layer may include, for example, nickel (Ni). The thickness of the plating layer may range from approximately 1.5 µm to 6.0 µm.

As the thickness of the battery housing 20 is smaller, the internal space is larger, and accordingly it is possible to manufacture the battery 1 with the improved energy density and high capacity. On the contrary, with the increasing thickness, it is possible to prevent the propagation of flames to the adjacent battery in an explosion test, thereby improving the safety.

As the thickness of the plating layer is smaller, it is more susceptible to corrosion, and as the thickness of the plating layer is larger, the manufacturing process complexity may increase or there is a higher likelihood that plating delamination may occur. Taking these conditions into account, it is necessary to set the optimum thickness of the battery housing 20 and the optimum thickness of the plating layer. Moreover, taking all the conditions into account, it is necessary to control each of the thickness of the closed portion of the battery housing 20 and the thickness of the sidewall.

Referring to FIGS. 2 and 11, the cap plate 30 may be made of, for example, a metal to ensure the strength. The cap plate 30 closes the open portion on the bottom of the battery housing 20. That is, the cap plate 30 forms the lower surface of the battery 1. In the battery 1 of the present disclosure, the cap plate 30 may be non-polar even when it is made of the conductive metal. The non-polar cap plate 30 may represent that the cap plate 30 is electrically insulated from the battery housing 20 and the terminal 40. The cap plate 30 may be non-polar, and the material does not need to be the conductive metal.

When the battery housing 20 of the present disclosure includes the beading portion, the cap plate 30 may be seated on the beading portion 21 of the battery housing 20. Additionally, when the battery housing 20 of the present disclosure includes the crimping portion 22, the cap plate 30 is fixed by the crimping portion 22. The sealing gasket G1 may be interposed between the cap plate 30 and the crimping portion 22 of the battery housing 20 to ensure sealability of the battery housing 20. Meanwhile, as described above, the battery housing 20 of the present disclosure may not include the beading portion 21 and/or the crimping portion 22, and in this case, the sealing gasket G1 may be interposed between the cap plate 30 and the fixing structure at the open portion of the battery housing 20 to ensure sealability of the battery housing 20.

Figure 12:
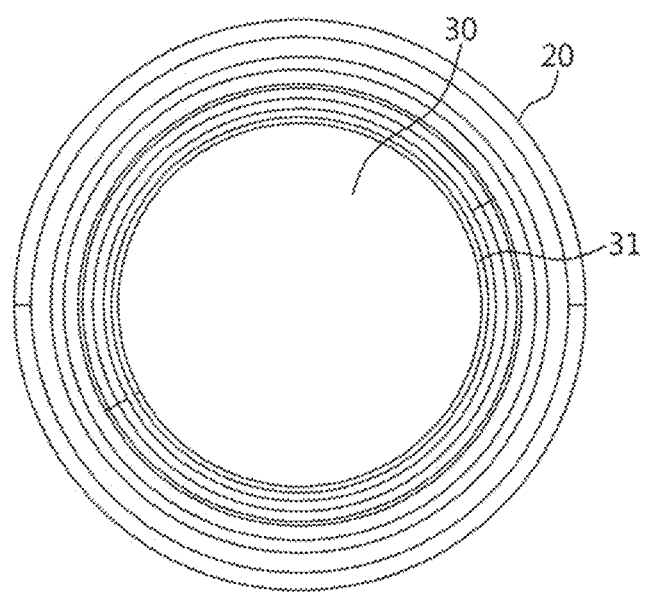
FIG. 12 is a diagram showing a lower surface of a battery according to an embodiment of the present disclosure.

Referring to FIGS. 11 and 12, the cap plate 30 may further include a venting portion 31 to prevent the internal pressure from rising above a preset pressure due to gas generated in the battery housing 20. The venting portion 31 corresponds to an area having a smaller thickness than the other areas in the cap plate 30. The venting portion 31 is structurally weaker than any other area. Accordingly, when the internal pressure of the battery housing 20 rises above the predetermined level due to abnormality in the battery 1, the venting portion 31 ruptures to force the gas generated in the battery housing 20 out. For example, the venting portion 31 may be formed by notching on any one or two surfaces of the cap plate 30 to partially reduce the thickness of the battery housing 20.

The battery 1 according to an embodiment of the present disclosure has a structure in which both the positive and negative terminals exist at the upper part as described below, so the upper part structure is more complicated than the lower part structure. Accordingly, for smooth venting of gas generated in the battery housing 20, the venting portion 31 may be formed in the cap plate 30 that forms the lower surface of the battery 1. As shown in FIG. 11, the lower end of the cap plate 30 is preferably disposed higher than the lower end of the battery housing 20. In this case, even when the lower end of the battery housing 20 contacts the ground or the bottom surface of the housing for forming a module or a pack, the cap plate 30 does not contact the ground or the bottom surface of the housing for forming a module or a pack. Accordingly, it is possible to prevent a phenomenon in which the pressure required for the rupture of the venting portion 31 is different from the design pressure due to the weight of the battery 1, thereby allowing for smooth rupture of the venting portion 31.

Meanwhile, when the venting portion 31 has a closed loop shape as shown in FIGS. 11 and 12, as the distance from the center of the cap plate 30 to the venting portion 31 is longer, the venting portion 31 may rupture more easily. When the same venting pressure is applied, as the distance from the center of the cap plate 30 to the venting portion 31 is longer, a larger force acts on the venting portion 31 and the venting portion 31 ruptures more easily. Additionally, as the distance from the center of the cap plate 30 to the venting portion 31 is longer, it is possible to achieve more smooth discharge of venting gas. From this perspective, the venting portion 31 may be preferably formed along the edge of the approximately flat area extended downwards (in a downward direction on the basis of FIG. 11) from the edge area of the cap plate 30.

Although FIG. 12 shows the venting portion 31 continuously formed in an approximately circular shape on the cap plate 30, the present disclosure is not limited thereto. The venting portion 31 may be discontinuously formed in an approximately circular shape on the cap plate 30, and may be formed in approximately a straight line or any other shape.

Figure 3:
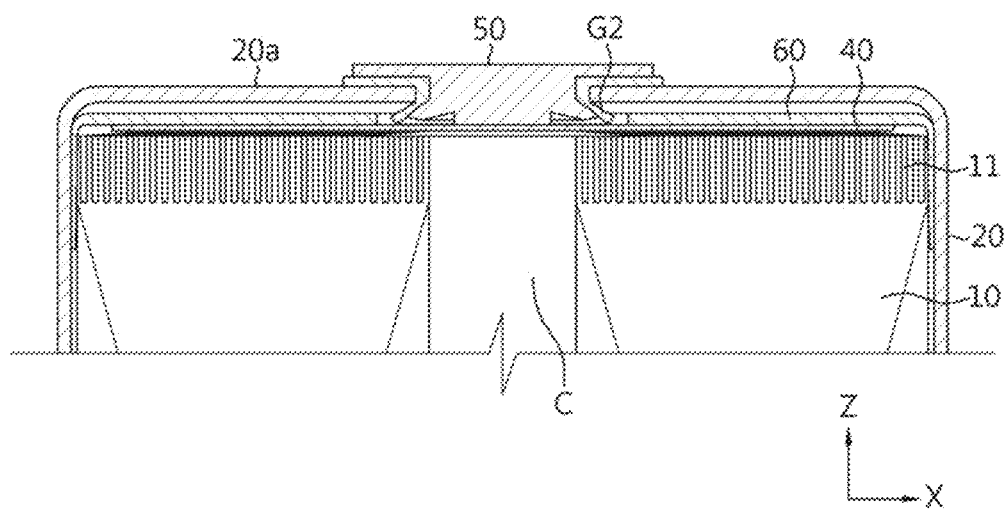
FIG. 3 is a partial cross-sectional view showing a battery according to an embodiment of the present disclosure.

Referring to FIGS. 2 to 4, the current collector plate (the first current collector plate) 40 is coupled onto the electrode assembly 10. The current collector plate 40 is made of a metal having conductive properties, and is connected to the first electrode tab 11.

Referring to FIG. 4, the current collector plate 40 may be coupled onto a coupling surface formed by bending the end of the first electrode tab 11 in a direction parallel to the current collector plate 40. The bending direction of the first electrode tab 11 may be, for example, a direction toward the winding center C of the electrode assembly 10. When the first electrode tab 11 is bent in this way, it is possible to reduce the space occupied by the first electrode tab 11, thereby improving the energy density. Additionally, it is possible to increase the coupling area between the first electrode tab 11 and the current collector plate 40, leading to the improved bond strength and the reduced resistance.

Referring to FIGS. 5 to 8 together with FIGS. 2 to 4, the current collector 40 includes the edge portion 41, the tab coupling portion 42 and the terminal coupling portion 43. The edge portion 41 may have an approximately rim shape having an empty space S at the center. Although the drawings of the present disclosure show the edge portion 41 having an approximately circular rim shape, the present disclosure is not limited thereto. The edge portion 41 may have an approximately square rim shape or any other shape.

The edge portion 41 may be disposed at the outermost side in the radial direction. An embodiment shows the edge portion 41 having a closed loop shape without discontinuity along the circumferential direction. This structure may firmly support the strength of the entire current collector plate 40 to prevent the welded part of the tab coupling portion 42 and the terminal coupling portion 43 as described below from being subjected to a shear force (in particular, a shear force acting in a direction parallel to the plane including the current collector plate).

However, the edge portion 41 does not need to have the closed loop shape, and may have the closed loop shape as a whole even though there is at least one cut-out.

The tab coupling portion 62 is extended inwards from the edge portion 41 and is coupled to the first electrode tab 11. The terminal coupling portion 43 is disposed inside of the edge portion 41, spaced apart from the tab coupling portion 42. The terminal coupling portion 43 may be coupled to the terminal 50 as described below by welding. The terminal coupling portion 43 may be, for example, disposed at the center of the space inside of the edge portion 41. The terminal coupling portion 43 may be disposed at the location corresponding to the hole at the winding center C of the electrode assembly 10.

The tab coupling portion 42 and the terminal coupling portion 43 are spaced apart from each other without direct connection, and they are electrically connected by the edge portion 41. As described above, the current collector plate 40 according to an embodiment of the present disclosure has a structure in which the tab coupling portion 42 and the terminal coupling portion 43 are not directly connected to each other and they are connected through the edge portion 41 disposed at the outermost centrifugal position in the radial direction, so when impacts and/or vibrations occur in the battery 1, it is possible to dissipate the impacts applied to the coupled part between the tab coupling portion 42 and the first electrode tab 11 and the coupled part between the terminal coupling portion 43 and the terminal 50. Accordingly, the current collector plate 40 of the present disclosure may minimize or prevent damage to the welded part due to external impacts. The current collector plate 40 of the present disclosure has a structure in which stress may concentrate on the connected part of the edge portion 41 and the terminal coupling portion 43 when external impacts are applied, and since a welded part for coupling between components is not formed in the connected part, it is possible to prevent product defects caused by damage to the welded part due to external impacts.

The current collector plate 40 may further include the connection portion 44 extended inwards from the edge portion 41 and connected to the terminal coupling portion 43. At least part of the connection portion 44 may have a smaller width than the tab coupling portion 42. In this case, when the electrical resistance at the connection portion 44 increases and the current flows through the connection portion 44, higher resistance occurs, so when an overcurrent occurs, a part of the connection portion 44 ruptures to interrupt the overcurrent. The width of the connection portion 44 may be adjusted to a suitable level considering the overcurrent interrupt function.

The connection portion 44 may include the tapered portion 44a having a gradual reduction in width along a direction from the inner surface of the edge portion 41 toward the terminal coupling portion 43. With the tapered portion 44a, it is possible to improve the strength of the component at the connected part of the connection portion 44 and the edge portion 41. Furthermore, the tapered portion 44a may act as an area that covers the bent electrode tab.

There may be a plurality of tab coupling portions 42. The plurality of tab coupling portions 42 may be arranged at equal intervals along the extension direction of the edge portion 41. The extended length of each of the plurality of tab coupling portions 42 may be equal. The terminal coupling portion 43 may be surrounded by the plurality of tab coupling portions 42. The connection portion 44 may be disposed between a pair of adjacent tab coupling portions 42. In this case, the distance from the connection portion 44 to any one of the pair of tab coupling portions 42 along the extension direction of the edge portion 41 may be equal to the distance from the connection portion 44 to the other one of the pair of tab coupling portions 42 along the extension direction of the edge portion 41.

There may be a plurality of connection portions 44. Each of the plurality of connection portions 44 may be positioned between the pair of adjacent tab coupling portions 42. The plurality of connection portions 44 may be arranged at equal intervals along the extension direction of the edge portion 41.

As described above, in the case that the plurality of tab coupling portions 42 and/or the plurality of connection portions 44 are provided, when the distance between the tab coupling portions 42 and/or the distance between the connection portions 44 and/or the distance between the tab coupling portion 42 and the connection portion 44 is constant, a flow of current from the tab coupling portion 42 to the connection portion 44 or a flow of current from the connection portion 44 to the tab coupling portion 42 may be smoothly formed.

The connection portion 44 may be extended from the center of the current collector plate 40 in the radial direction, and may be linearly extended. Accordingly, it is possible to reduce the electrical conduction distance, and even when a compression force or a tensile force is applied to any one connection portion 44 in the extension direction, it is possible to prevent any change in the shape of the connection portion 44 and prevent deformation of the whole shape of the current collector plate 40. Accordingly, it is possible to prevent the current collector plate 40 from moving so much, thereby preventing the first electrode tab 11 compressed by the current collector plate 40 from moving or deforming by the movement of the current collector plate 4.

Furthermore, due to the structure in which the plurality of connection portions 44 having a straight line shape is connected by the terminal coupling portion 43, when the connection portion 44 on any one side of the terminal coupling portion 43 is subjected to an external force, the connection portion 44 connected to the other side functions to support it. Furthermore, even though the tab coupling portion 44 and the terminal coupling portion 43 of the current collector plate 40 are subjected to forces in different axial directions, torsion stress do not occur at the tab coupling portion 44 and the terminal coupling portion 43, thereby protecting the welding part.

The confined part of the current collector plate 40 to the other component by welding is the terminal coupling portion 43 and the tab coupling portion 44. Additionally, they are connected by the edge portion 41. The terminal coupling portion 43 is disposed at the center in the radial direction, the edge portion 41 is disposed at the edge in the radial direction, and the tab coupling portion 44 is disposed between the center and the edge in the radial direction.

Accordingly, when the terminal coupling portion 43 is subjected to a force in the radial direction or the axial direction relative to the tab coupling portion 44, the connection portion 44 having a linear shape may transmit the force to the edge portion 41, and the edge portion 41 extended in the circumferential direction may respond to the external force as it flexibly deforms.

Referring to FIGS. 9 and 10, the connection portion 44 may include the notching portion N having a local reduction in cross sectional area along the extension direction of the connection portion 44. The reduction in cross sectional area may be accomplished by reducing the width and/or thickness of the connection portion 44. With the notching portion N, it is possible to interrupt the current quickly when an overcurrent occurs as the electrical resistance at the area having the notching portion N increases.

When the connection portion 44 includes the tapered portion 44a, the notching portion N may be disposed closer to the tapered portion 44a than the terminal coupling portion 43. In this case, due to the structure of the edge portion 44a having a gradual reduction in width, when the notching portion N is disposed at an area adjacent to a high heat generation area, it is possible to interrupt the overcurrent more quickly.

Referring to FIGS. 1 to 3 and 5, the terminal 50 is made of a metal having conductive properties, and is coupled to the terminal coupling portion 43 of the current collector plate (the first current collector plate) 40. The terminal 50 may pass through the closed portion opposite to the open portion of the battery housing 20. When the battery 1 of the present disclosure includes the insulator 60, the terminal 50 is coupled to the terminal coupling portion 43 of the current collector plate 40 through the insulator 60.

The terminal 50 is electrically connected to the first electrode tab 11 of the electrode assembly 10 through the current collector plate 40, and thus has the first polarity. Accordingly, the terminal 50 may act as the first electrode terminal of the battery 1 of the present disclosure. Additionally, in the battery 1 of the present disclosure, the approximately flat surface of the closed portion of the battery housing 20 having the second polarity may act as the second electrode terminal 20a. Referring to FIG. 1, a busbar B is connected to each of the first electrode terminal 50 and the second electrode terminal 20a of the battery 1 of the present disclosure. In each of the first electrode terminal 50 and the second electrode terminal 20a, to ensure a sufficient coupling area with the busbar B, the width D1 of the exposed area of the first electrode terminal 50 through the battery housing 20 may be set to the range of approximately 10% to 60% of the width D2 of the second electrode terminal 20a, i.e., the upper surface of the battery housing 20.

When the terminal 50 has the first polarity, the terminal 50 is electrically insulated from the battery housing 20 having the second polarity. The insulation between the terminal 50 and the battery housing 20 may be accomplished by various methods. For example, the insulation may be accomplished by placing the insulation gasket G2 between the terminal 50 and the battery housing 20. The insulation gasket G2 may be made of, for example, a resin material having insulating properties.

Alternatively, the insulation may be accomplished by forming an insulating coating layer at a part of the terminal 50. Alternatively, the terminal 50 may be structurally firmly fixed to prevent the contact between the terminal 50 and the battery housing 20. Alternatively, two or more of the above-described methods may be applied together.

Figure 5:
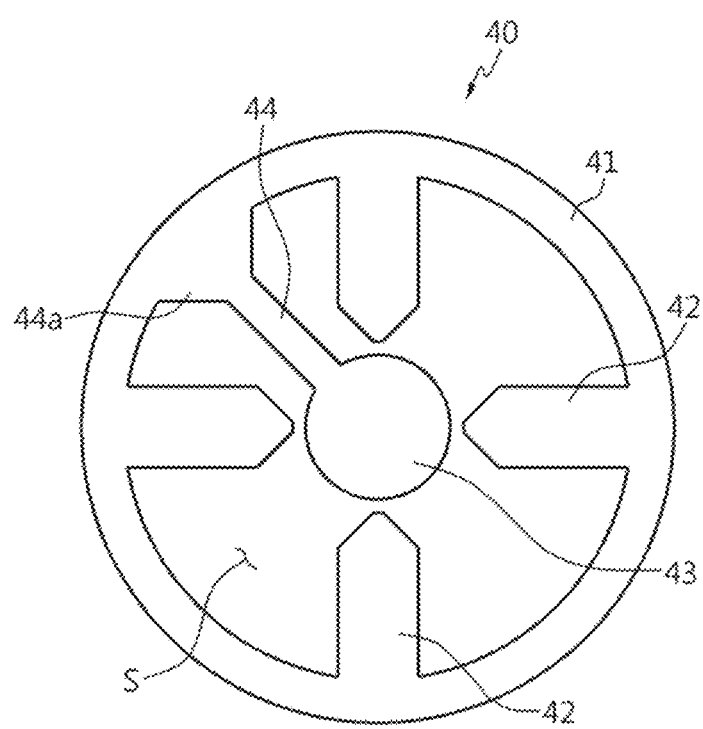
FIGS. 5 to 8 are diagrams showing various shapes of a current collector plate (a first current collector plate) according to an embodiment of the present disclosure.
Figure 6:
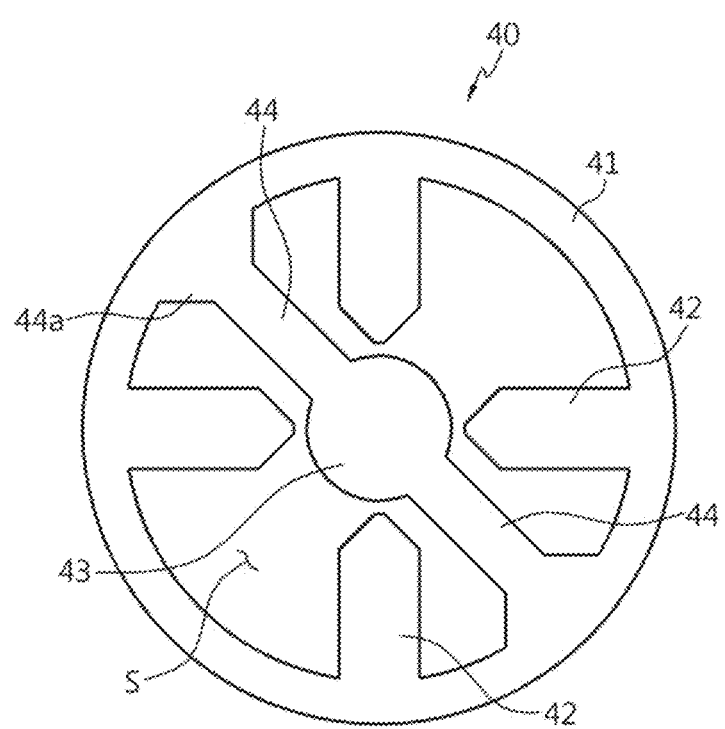
Figure 7:
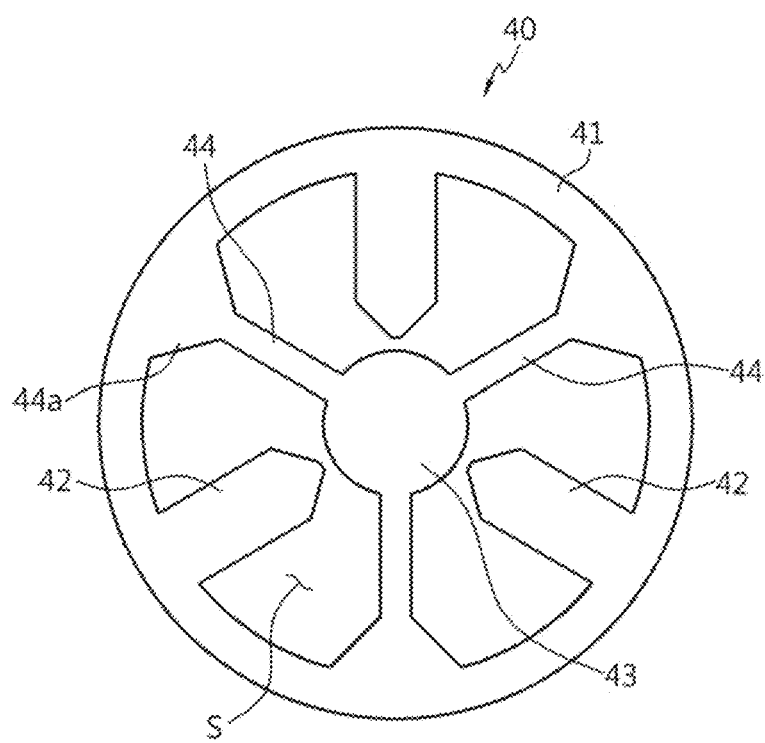

Referring to FIGS. 2 and 3 together with FIG. 5, the insulator 60 may be disposed between the current collector plate (the first current collector plate) 40 and the inner surface of the battery housing 20. The insulator 60 prevents the contact between the current collector plate 40 and the battery housing 20. The insulator 60 may be positioned between the upper end of the outer circumferential surface of the electrode assembly 10 and the inner surface of the battery housing 20. This is to prevent the contact between the first electrode tab 11 extended toward the closed portion of the battery housing 20 and the inner circumferential surface of the battery housing 20.

When the battery 1 of the present disclosure includes the insulator 60, the terminal 50 is coupled to the current collector plate 40 through the insulator 60. To allow the terminal 50 to pass through, the insulator 60 may have an opening at a location corresponding to the terminal coupling portion 43 of the current collector plate 40.

Referring to FIG. 11, the current collector plate (the second current collector plate) 70 is coupled to a lower portion of the electrode assembly 10. The current collector plate 70 is made of a metal having conductive properties and coupled to the second electrode tab 12. Additionally, the current collector plate 70 is electrically connected to the battery housing 20. The edge area of the current collector plate 70 may be fixed between the inner surface of the battery housing 20 and the sealing gasket G1. In this case, the current collector plate 70 may be welded onto a seating surface formed by the beading portion 21 of the battery housing 20.

Referring to FIG. 4, the current collector plate 70 may be coupled onto the coupling surface formed by bending the end of the second electrode tab 12 in the direction parallel to the current collector plate 70. The bending direction of the second electrode tab 12 may be, for example, a direction toward the winding center C of the electrode assembly 10. When the second electrode tab 12 is bent in this way, it is possible to reduce the space occupied by the second electrode tab 12, thereby improving the energy density. Additionally, it is possible to improve the bonding strength between the second electrode tab 12 and the current collector plate 70 and reduce the resistance.

Meanwhile, in the present disclosure, each of the first electrode tab 11 and the second electrode tab 12 may a plurality of segments spaced apart from each other by the cutout grooves formed regularly in the uncoated portion along the winding direction of the electrode. The plurality of segments may be exposed outside of the separator along the winding axis direction. The plurality of segments is arranged to be overlapped along the radial direction of the electrode assembly to form a plurality of segment alignments spaced apart in the circumferential direction. Additionally, the segments included in each segment alignment may be bent along the radial direction to form a bent surface region.

In an embodiment, the tab coupling portion 42 of the current collector plate 40 may be coupled to the bent surface region of the segment alignments, and the connection portion 44 of the current collector plate 40 may be positioned between the segment alignments spaced apart from each other in the circumferential direction.

Figure 13:
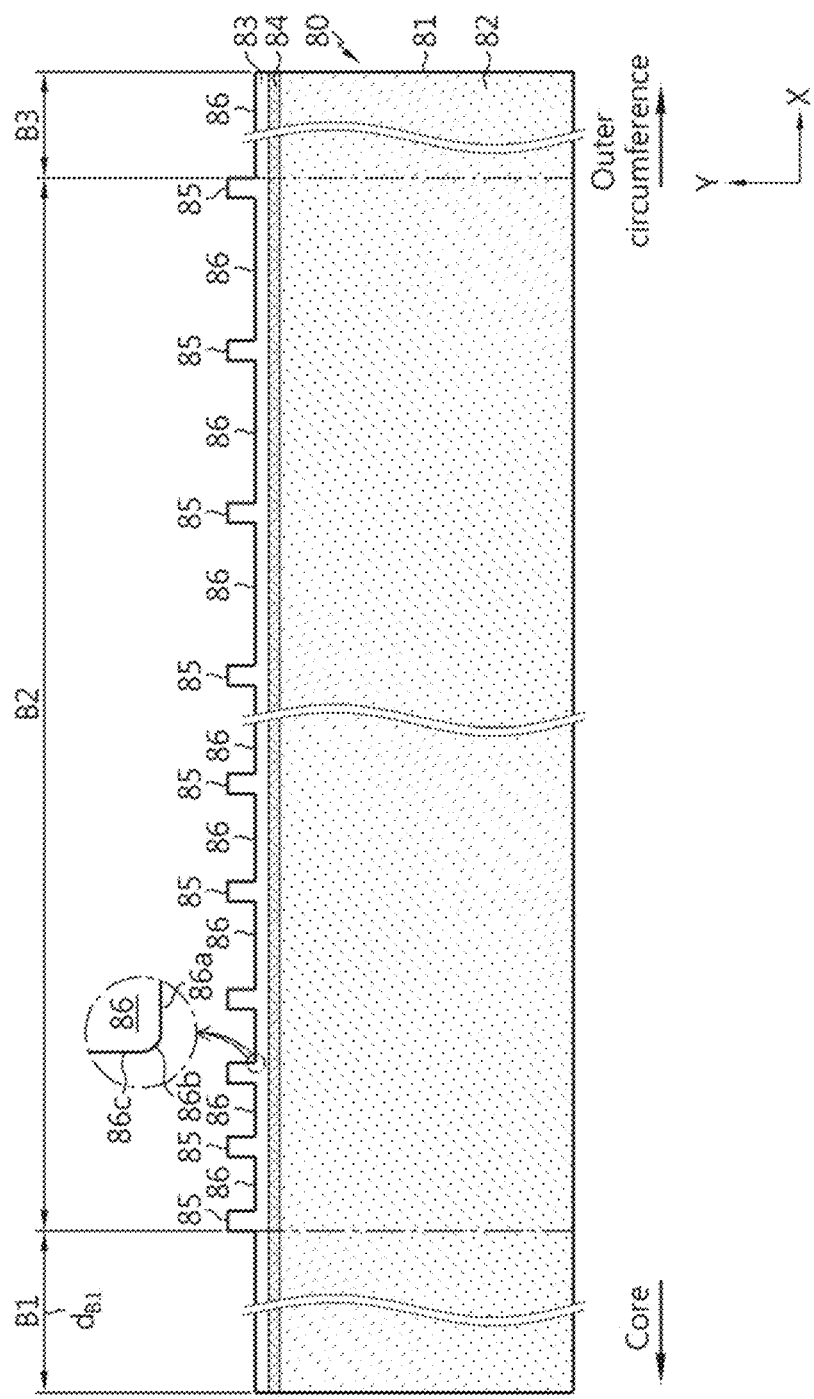
FIG. 13 is an exemplary plane view showing an electrode structure including a plurality of segments to form a plurality of segment alignments along a circumferential direction of an electrode assembly.

FIG. 13 is an exemplary plane view showing the electrode structure including the plurality of segments to form the plurality of segment alignments along the circumferential direction of the electrode assembly.

Referring to FIG. 13, an electrode 80 of an embodiment includes a sheet-shaped current collector 81 and an active material layer 82. The current collector 81 may include a metal foil. The metal foil may be a metal having conductive properties, for example, aluminum or copper. The current collector 81 may be appropriately selected according to the polarity of the electrode 80. The metal foil may be replaced with a metal mesh. The metal foil may have a structure in which a metal film is coated on two surfaces of a substrate of an insulating film. The active material layer 82 is formed on at least one surface of the current collector 81. The active material layer 82 is formed along the winding direction X. The electrode 80 includes an uncoated portion 83 at the long side end in the winding direction X. The uncoated portion 83 is a part of the current collector 81 not coated with the active material. In the electrode 80, the area of the current collector 81 having the active material layer 82 may be referred to as an active material portion.

In the electrode 80, the width in a direction following the short side of the current collector 81 may be 60 mm to 70 mm, and the length in a direction following the long side of the current collector 81 may be 3 m to 5 m. Accordingly, a ratio of the short side of the electrode 80 to the long side may be 1.2% to 2.3%. The ratio is much smaller than 6% to 11% of that of an electrode used in a cylindrical battery having the form factor of 1865 or 2170.

Preferably, an insulating coating layer 84 may be formed at the boundary of the active material layer 82 and the uncoated portion 83. At least part of the insulating coating layer 84 overlaps the boundary of the active material layer 82 and the uncoated portion 83. The insulating coating layer 84 prevents a short circuit between two electrodes having the opposite polarities with the separator interposed therebetween. The insulating coating layer 84 is 0.3 mm to 5 mm in width to cover the boundary of the active material layer 82 and the uncoated portion 83. The insulating coating layer 84 includes polymer resin, and may include inorganic fillers such as $Al_2O_3$ or $SiO_2$. Since the part of the current collector 81 covered with the insulating coating layer 84 is not coated with the active material layer, it may be regarded as an uncoated portion.

The uncoated portion 83 includes a first part B1 near a core, a second part B3 near an outer circumference and a third part B2 between the first part B1 and the second part B3. The core and the outer circumference indicate a central area and an outer circumferential surface of the electrode assembly, respectively, when the electrode 80 is wound as the electrode assembly.

Among the first part B1, the second part B3 and the third part B2, the third part B2 has the longest length, and occupies a majority of the length of the electrode 80. The first part B1 may form multiple winding turns near the core of the electrode assembly. The second part B3 may form at least one winding turn near the outer circumference of the electrode assembly.

The third part B2 includes the plurality of segments 85. The plurality of segments 85 is used for electrical connection to the current collector plate 40, and thus corresponds to the first electrode tab 11. Preferably, the segments 85 may have a rectangular shape. Alternatively, the segments 85 may have a trapezoidal shape, a parallelogram shape or a semi-circular shape. Many modifications may be made to the geometric shape of the segments 85.

The plurality of segments 85 may be notched by a laser. Alternatively, the segments 85 may be formed by the known metal foil cutting process, for example, ultrasonic cutting or punching. In the winding direction X, the distance (pitch) between the segments 85 may increase as it goes from the core to the outer circumference.

The cutout groove 86 is positioned between the adjacent segments 85 in the winding direction X. The cutout groove 86 is formed in the notching process of the segments 85. The cutout groove 86 includes a flat bottom portion 86a, a round portion 86b adjacent to the flat bottom 86a and a side portion 86c of the segment 85. Here, the round portion 86b may mitigate the stress when the segment 85 is bent, thereby preventing cracking at the lower end of the segment 85.

To prevent damage to the active material layer 82 and/or the insulating coating layer 84 when bending the segment 85, it is desirable to form a predetermined gap between the bottom portion 86a of the cutout groove 86 and the active material layer 82. It is because when the segment 85 is bent, stress concentrates on or near the bottom portion 86a of the cutout groove 86. The gap is 0.2 mm to 4 mm, and preferably 1.5 mm to 2.5 mm. When the gap is adjusted to the corresponding numerical range, it is possible to prevent stress-induced damage to the active material layer 82 and/or the insulating coating layer 84 near the lower end of the cutout groove 86 when bending the segment 85. Additionally, the gap may prevent damage to the active material layer 82 and/or the insulating coating layer 84 caused by the tolerance in the notching or cutting process of the segment 85. The lower end of the cutout groove 86 and the insulating coating layer 84 may be spaced apart by 0.5 mm to 1.0 mm. When the electrode 80 is wound, the end in the winding axis Y direction of the insulating coating layer 84 may be disposed in the range of −2 mm to 2 mm along the winding axis direction on the basis of the end of the separator. The insulating coating layer 84 may prevent a short circuit between two electrodes having the opposite polarities with the separator interposed therebetween and support the location at which the segment 85 is bent. To improve the short circuit prevention effect between two electrodes, the insulating coating layer 84 may be exposed outside of the separator. Additionally, to maximize the short circuit prevention effect between two electrodes, the insulating coating layer 84 may increase in width to place the end in the winding axis Y direction of the insulating coating layer 84 at a higher position than the bottom portion 86a of the cutout groove 86. In an embodiment, the end in the winding axis direction of the insulating coating layer 84 may be disposed in the range of −1 mm to +1 mm on the basis of the bottom portion 86a of the cutout groove 86.

Figure 14:
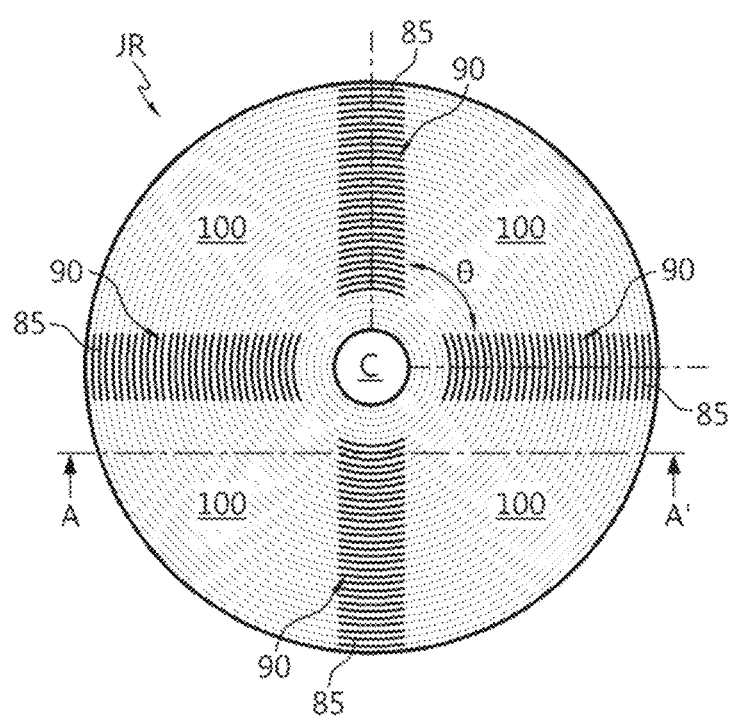
FIG. 14 is a top view of an electrode assembly manufactured by winding positive and negative electrodes having the electrode structure shown in FIG. 13 together with a separator.
Figure 15:
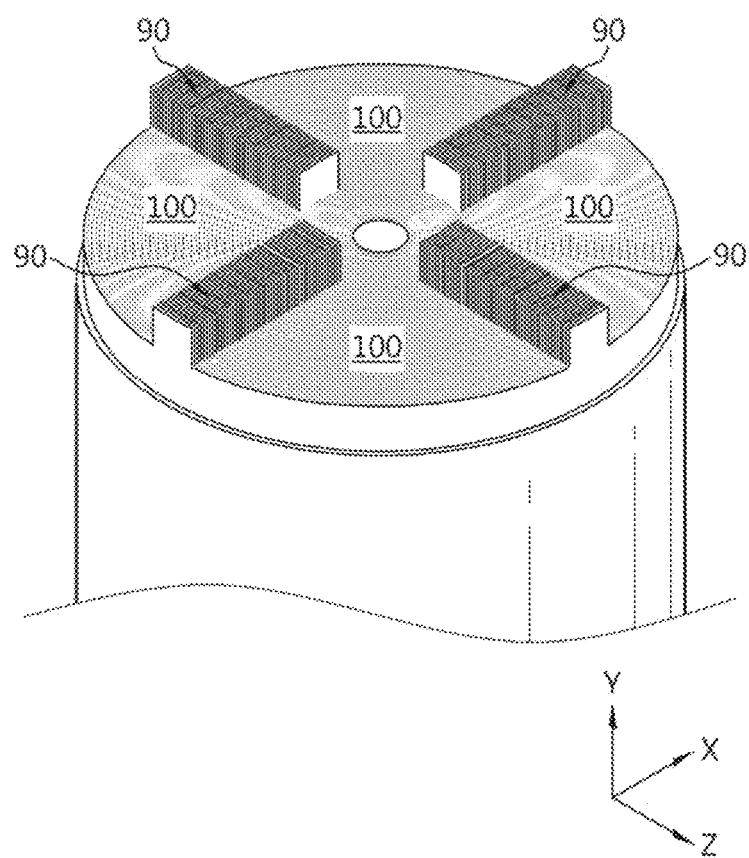
FIG. 15 is a partial perspective view showing an upper part of an electrode assembly.
Figure 16:
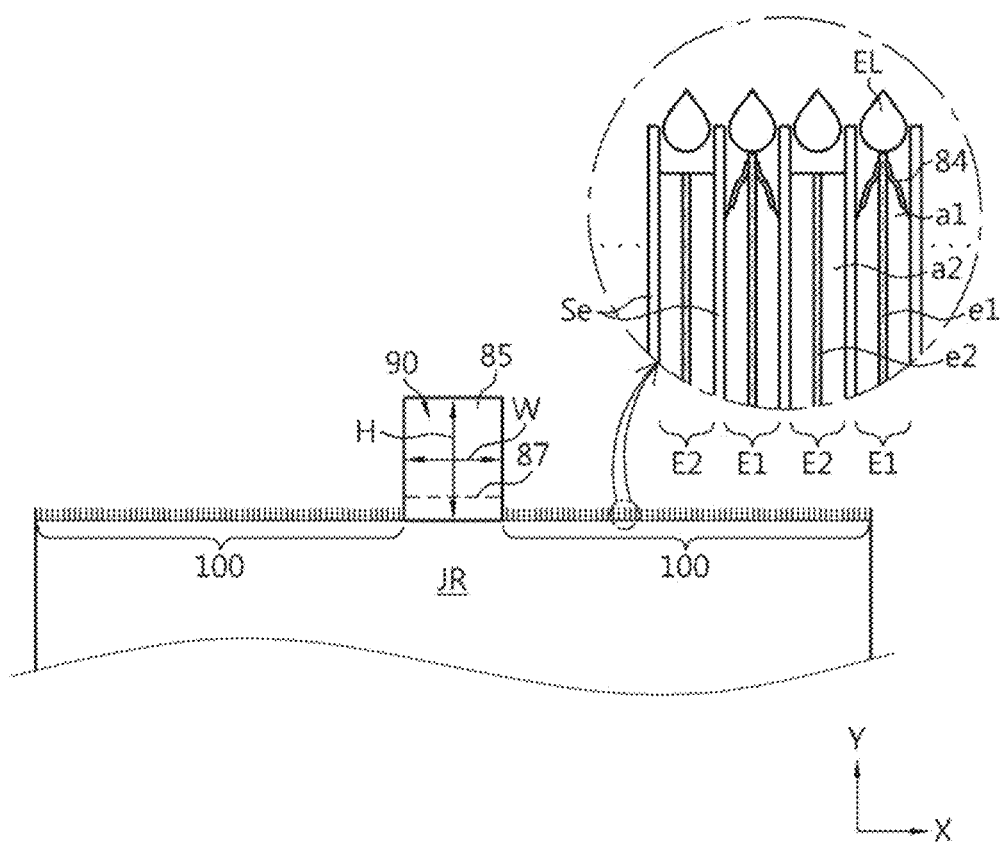
FIG. 16 is a partial cross-sectional view taken along the line A-A' of FIG. 14.

FIG. 14 is a top view of the electrode assembly JR manufactured by winding the positive electrode and the negative electrode having the structure of the electrode 80 shown in FIG. 13 together with the separator, FIG. 15 is a partial perspective view showing the upper part of the electrode assembly JR, and FIG. 16 is a partial cross-sectional view taken along the line A-A' of FIG. 14. The upper part of the electrode assembly JR shown in the drawings is the positive electrode side.

Referring to FIGS. 14 to 16, the plurality of segments 85 protrudes from the separator and protrudes in the winding axis direction Y. Additionally, the plurality of segments 85 is radially arranged around the core C of the electrode assembly JR to form a segment alignment 90. The segment alignment 90 refers to an assembly of segments 85 arranged such that the segments 85 at different winding turns overlap in the radial direction of the electrode assembly JR.

The plurality of segments 85 included in the segment alignment 90 overlap each other in the radial direction, which means that when a predetermined straight line passing through the segment alignment 90 from the center of the core C is drawn, all the segments 85 intersect the corresponding straight line.

The segment alignment 90 is extended to a predetermined length along the radial direction of the electrode assembly JR, and in the segment alignment 90, the segments 85 of the winding turns adjacent to in the radial direction may have an overlap in the angle of circumference measured on the basis of the center of the core.

The number of segment alignments 90 may be 4, 3 or 2, and the number of segment alignments 90 is not limited thereto. The plurality of segment alignments 90 may be arranged at equal intervals in the circumferential direction. The segment alignments 90 may be arranged at non-equal intervals in the circumferential direction.

When the number of segment alignments 90 is 4, the angle between the adjacent segment alignments 90 in the circumferential direction may be about 90°. When the number of segment alignments 90 is 3, the angle between the adjacent segment alignments 90 in the circumferential direction may be about 120°. When the number of segment alignments 90 is 2, the angle between the adjacent segment alignments 90 in the circumferential direction may be about 180°.

The angle θ between the adjacent segment alignments 90 in the circumferential direction is defined as an angle between a side extension line of one segment alignment 90 and a side extension line of another segment alignment 90 closest to the one segment alignment 90 when the electrode assembly JR is viewed from the winding axis direction Y. When an imaginary line (see the single dashed line) passing through the center of the segment alignment 90 from the center of the core C of the electrode assembly JR is drawn, the angle θ is substantially the same as the angle of an adjacent imaginary line in the circumferential direction.

The pitch of the segments 85 adjacent to each other in the winding direction X increases as it goes from the core to the outer circumference in the winding direction X of the electrode assembly JR, but may be determined according to a preset rule to form the segment alignment 90 in the radial direction of the electrode assembly JR. The pitch of the segments 85 substantially corresponds to the width of the cutout groove 86 in the winding direction.

An electrolyte impregnation portion 100 is formed between the adjacent segment alignments 90 in the circumferential direction of the electrode assembly JR. The electrolyte impregnation portion 100 is formed by winding the uncoated portion 83 having the cutout groove 86.

As shown in FIG. 16, the electrolyte impregnation portion 100 is a region in which the electrolyte EL may primarily impregnate, and its height is lower than the height of the segment alignment 90 in the winding axis direction Y. The electrolyte impregnation portion 100 does not have any segment 85 protruding from the separator Se. Additionally, in the electrolyte impregnation portion 90, the end of the active material layer a1 of the positive electrode E1 and the end of the active material layer a2 of the negative electrode E2 are spaced apart by a predetermined distance more downwards than the end of the separator Se between the separators Se adjacent to each other in the radial direction of the electrode assembly JR. Accordingly, the insulation between the positive electrode E1 and the negative electrode E2 may be maintained. In an embodiment, the predetermined distance may be 0.6 mm to 1 mm. The insulating coating layer 84 may be formed in at least one of the end of the positive electrode E1 and the end of the negative electrode E2. The end of the positive electrode E1 may include a sliding portion having a gradual reduction in thickness of the active material layer a1. The arrangement structure of the electrode and the separator shown in FIG. 16 may be applied to the lower part of the electrode assembly JR. Preferably, at the lower part of the electrode assembly JR, the insulating coating layer 84 and the sliding portion may be formed at the end of the negative electrode E2.

The electrolyte EL may be impregnated into the electrode assembly JR while in direct contact with the positive electrode E1 and the negative electrode E2 through the gap between the ends of the separators Se. Specifically, the electrolyte EL loaded on the electrode assembly JR contacts the end of the positive electrode E1 and the end of the negative electrode E2 as well as the end of the separator Se at the same time and permeates into the electrode assembly JR fast. Accordingly, it is possible to remarkably improve the electrolyte wettability (rate and uniformity).

Preferably, the height H of the segment 85 may be substantially equal in the radial direction of the electrode assembly JR. In an example, the height of the segment 85 may be 4 mm, 5 mm, 6 mm, 7 mm, 8 mm, 9 mm or 10 mm. Alternatively, the height H of the segment 85 may increase stepwise as it goes from the core of the electrode assembly JR to the outer circumference. In an example, the height of the segment 85 may increase stepwise in the range of 2 mm to 10 mm. In an example, when the diameter of the core of the electrode assembly JR is 8 mm, the height of the segment 85 may increase from 2 mm to 10 mm by 1 mm in the radial range of 6 mm to 14 mm. When the height H of the segment 85 increases stepwise, it is possible to increase the number of stacks of the segments 85 in the bent surface region of the segments 85 and increase the length of the area in which the number of stacks is uniform in the radial direction of the electrode assembly JR.

The width W of the segment 85 is preferably substantially the same or larger than the width of the tab coupling portion 42 of the current collector plate 40. The width W of the segment 85 may be, for example, appropriately selected in the range of 3 mm to 11 mm.

Referring to FIGS. 13 and 16, the location 87 at which the segment 85 is bent may be set to a line passing through the bottom portion 86a of the cutout groove 86 or a location spaced a predetermined distance apart upwards from the line. When the segment 85 is bent toward the core at a predetermined distance apart from the lower end of the cutout groove 86, it is easier to arrange the segments to be overlapped in the radial direction. When the segments 85 are bent, the outer segment on the basis of the center of the core presses down the inner segment. In this instance, when the location 87 of bending is spaced a predetermined distance apart from the lower end of the cutout groove 86, the inner segment is pressed by the outer segment in the winding axis direction, making it easier to arrange the segments 85 to be overlapped. The spaced apart distance of the location 87 of bending may be 3 mm or less, and preferably 2 mm or less.

The pitch of the segments 85 corresponds to the width of the cutout groove 86 in the winding direction X, and may be predetermined to form the segment alignment 90 at a preset area in the radial direction of the electrode assembly JR when winding the electrode 80.

Figure 17:
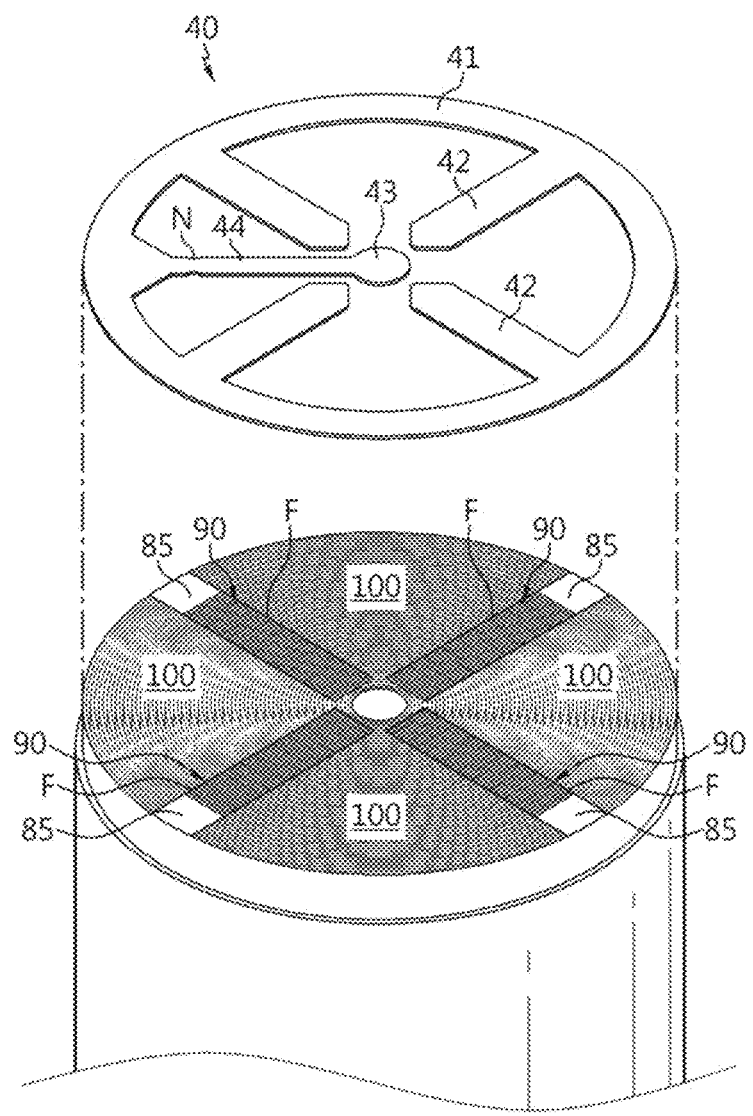
FIG. 17 is a diagram showing a process of coupling a current collector plate onto an electrode assembly using a bent surface region formed by bending segments included in segment alignments toward a core of an electrode assembly according to an embodiment of the present disclosure.

FIG. 17 is a diagram showing a process of coupling the current collector plate 40 onto the electrode assembly JR using the bent surface region F formed by bending the segments 85 included in the segment alignments 90 toward the core of the electrode assembly JR according to an embodiment of the present disclosure.

Referring to FIG. 17, the segments 85 included in the plurality of segment alignments 90 may be bent toward the core of the electrode assembly JR to form the bent surface region F. The surface of the bent surface region F is approximately perpendicular to the winding axis direction of the electrode assembly JR. The bent surface region F corresponds to an area in which the segments 85 are stacked in multiple layers in the winding axis direction. The number of stacks of the segments 85 may be preferably 10 or more. Since the bent surface region F is formed on the segment alignment 90, the segment alignment 90 should be understood as the structure including the bent surface region F.

Figure 18A:
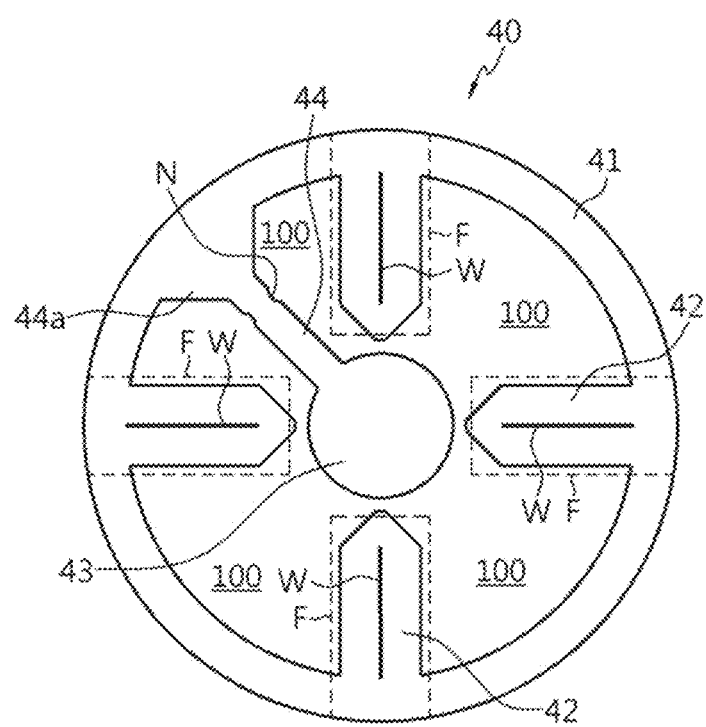
FIGS. 18*a* and 18*b* are top views showing a current collector plate according to an embodiment of the present disclosure welded onto an electrode assembly.
Figure 18B:
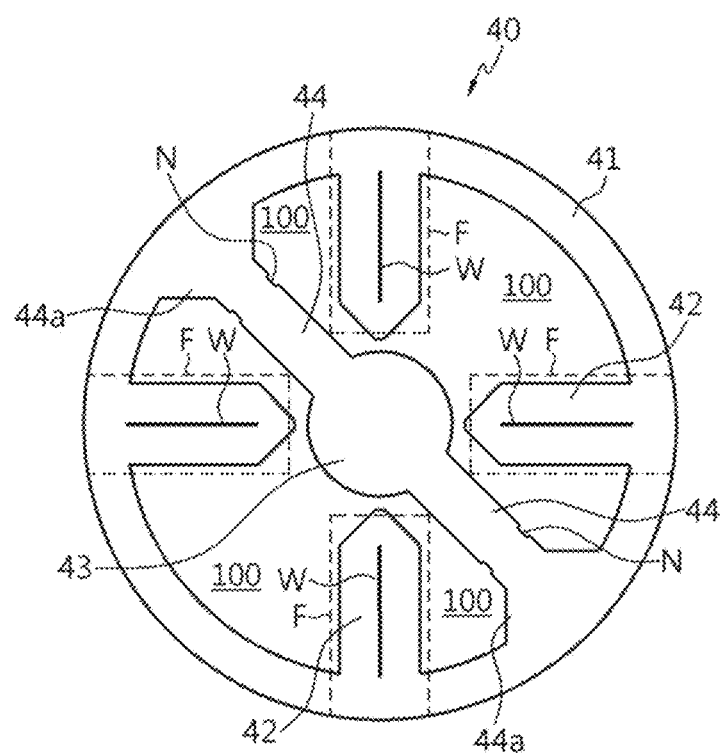

FIGS. 18a and 18b are top views showing the current collector plate 40 according to an embodiment of the present disclosure welded onto the electrode assembly JR.

Referring to FIGS. 18a and 18b, each tab coupling portion 42 included in the current collector plate 40 may be coupled to the bent surface region F on the corresponding segment alignment 90 through welding.

Since the bent surface region F is flat and wider than the tab coupling portion 42, the tab coupling portion 42 may be easily mounted and welded on the bent surface region F.

The connection portion 44 is positioned on the electrolyte impregnation portion 100 between the adjacent segment alignments 90 in the circumferential direction. As shown in FIG. 16, in the electrolyte impregnation portion 100, the end of the positive electrode E1 and the end of the negative electrode E2 are spaced the predetermined distance apart downwards from the end of the separator Se. Accordingly, the connection portion 44 may be also spaced apart from the end of the positive electrode E1 and the end of the negative electrode E2 and electrically insulated from the ends of the electrodes.

In FIGS. 18a and 18b, the reference character W indicates a welding pattern. The welding pattern W may be at least one continuous or discontinuous linear pattern along the extension direction of the tab coupling portion 42. The welding pattern W may be formed by laser welding. Alternatively, the welding pattern W may be formed by the other known welding method, for example, ultrasonic welding, resistance welding or the like.

The connection portion 44 is positioned on the electrolyte impregnation portion 100 on the basis of the winding axis direction Y. Additionally, since the location at which the segment 85 is bent spaced apart from the electrolyte impregnation portion 100 as shown in FIG. 16, there is also a predetermined gap corresponding to an empty space between the bent surface region F formed by the bending of the segments 85 and the electrolyte impregnation portion 100.

Accordingly, when the notching portion N of the connection portion 44 is interrupted by an overcurrent, the electrical connection of the terminal coupling portion 43 and the tab coupling portion 42 may be completely disconnected by the gap.

Meanwhile, when the bent surface region F is formed over the entire surface of the end of the electrode assembly JR, even though the notching portion N is ruptured by the overcurrent, the electrical connection of the terminal coupling portion 43 and the tab coupling portion 42 may be indirectly maintained through the bent surface region F.

Accordingly, in terms of reliable overcurrent interruption, the bent surface region F may be locally formed at only a part of the end of the electrode assembly JR by adjusting the pitch of the segments 85, and the connection portion 44 including the notching portion N may be positioned at an area having no bent surface region F.

Figure 19B:
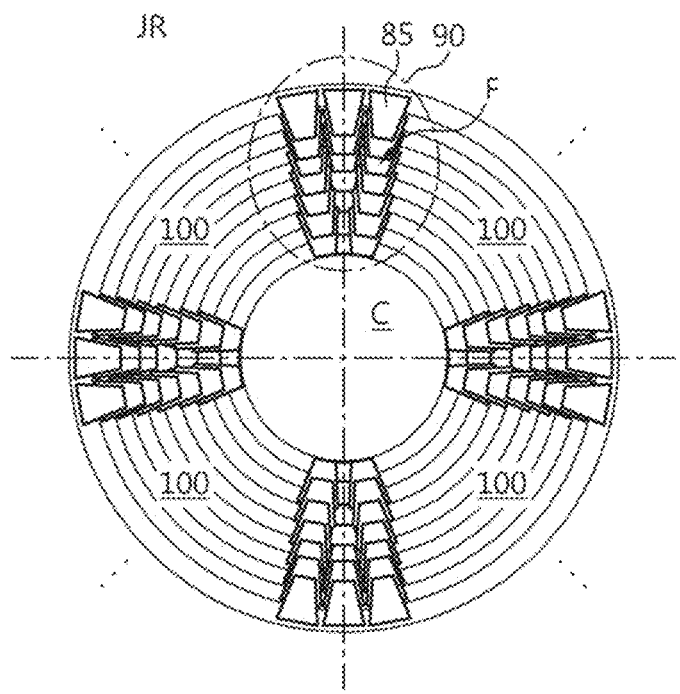
FIG. 19*b* is a top view showing a bent surface region formed by bending segments included in segment alignments according to another embodiment of the present disclosure.

FIG. 19a is a plane view showing the structure of the electrode 80 according to another embodiment of the present disclosure, and FIG. 19b is a top view showing the structure of the segment alignment 90 on the electrode assembly in which the structure of the electrode 80 of FIG. 19a is applied to the positive electrode and the negative electrode.

Referring to FIGS. 19a and 19b, the electrode 80 according to another embodiment of the present disclosure has a structure in which segment groups 85g are separated by the pitch between groups. The pitch may increase gradually or stepwise along the winding direction X. The segment groups 85g may include at least one segment 85. The shape of the segment 85 is rectangular. However, modification may be made to the shape of the segment 85, for example, any other geometric shape such as a trapezoidal shape.

The segment groups 85g are arranged to be overlapped along the radial direction to form the segment alignment 90 when the electrode assembly is wound. The segment alignment 90 has an approximately fan shape. The segments 85 included in the segment alignment 90 may be bent toward the core C to form the bent surface region F. In the same way as the above-described embodiment, the tab coupling portion 42 of the current collector plate 40 may be welded to the bent surface region F of the segment alignment 90. Additionally, the connection portion 44 of the current collector plate 40 may be positioned on the electrolyte impregnation portion 100 between the adjacent segment alignments 90 in the circumferential direction.

The cylindrical battery to which the above-described embodiment of the present disclosure is applied may be, for example, a cylindrical battery having a ratio of form factor (a value obtained by dividing the diameter of the cylindrical battery by its height, i.e., defined as a ratio of diameter @ to height H) larger than approximately 0.4.

Here, the form factor refers to a value indicating the diameter and height of the cylindrical battery. The cylindrical battery according to an embodiment of the present disclosure may be, for example, 46110 battery, 4875 battery, 48110 battery, 4880 battery and 4680 battery. In the numbers indicating the form factor, the former two numbers indicate the diameter of the battery, and the remaining numbers indicate the height of the battery.

The battery according to an embodiment of the present disclosure may be a battery having an approximately cylindrical shape with the diameter of approximately 46 mm, the height of approximately 110 mm and the ratio of form factor of approximately 0.418.

The battery according to another embodiment may be a battery having an approximately cylindrical shape with the diameter of approximately 48 mm, the height of approximately 75 mm and the ratio of form factor of approximately 0.640.

The battery according to another embodiment may be a battery having an approximately cylindrical shape with the diameter of approximately 48 mm, the height of approximately 110 mm and the ratio of form factor of approximately 0.436.

The battery according to another embodiment may be a battery having an approximately cylindrical shape with the diameter of approximately 48 mm, the height of approximately 80 mm, and the ratio of form factor of approximately 0.600.

The battery according to another embodiment may be a battery having an approximately cylindrical shape with the diameter of approximately 46 mm, the height of approximately 80 mm, and the ratio of form factor of approximately 0.575.

Conventionally, batteries having the ratio of form factor of approximately 0.4 or less have been used. That is, for example, 1865 battery and 2170 battery have been used. The 1865 battery has the diameter of approximately 18 mm, the height of approximately 65 mm and the ratio of form factor of approximately 0.277. The 2170 battery has the diameter of approximately 21 mm, the height of approximately 70 mm and the ratio of form factor of approximately 0.300.

Referring to FIG. 20, the battery pack 3 according to an embodiment of the present disclosure includes a battery assembly including a plurality of batteries 1 according to an embodiment of the present disclosure electrically connected to each other and a pack housing 2 accommodating the battery assembly. In the accompanying drawings, for convenience of illustration in the drawings, the components such as the busbar for electrical connection, a cooling unit and a power terminal are omitted.

Referring to FIG. 21, the vehicle 5 according to an embodiment of the present disclosure may be, for example, an electric vehicle, a hybrid electric vehicle or a plugin hybrid electric vehicle, and includes the battery pack 3 according to an embodiment of the present disclosure. The vehicle 5 includes a four-wheeled vehicle and a two-wheeled vehicle. The vehicle 5 operates using the power supplied from the battery pack 3 according to an embodiment of the present disclosure.

Although the present disclosure has been hereinabove described with reference to the accompanying drawings, the present disclosure is not limited to the disclosed embodiments and the accompanying drawings, and it is obvious that a variety of modifications may be made thereto within the scope of the technical aspects of the present disclosure. Although the description of the embodiment of the present disclosure does not explicitly describe the effect by the operation of the element of the present disclosure, it is apparent that the predictable effect by the corresponding element should be acknowledged.

What is claimed is:

1. A battery, comprising: an electrode assembly including a first electrode and a second electrode and a separator interposed therebetween wound together around a winding axis to define a core and an outer circumferential surface, wherein the first electrode and the second electrode have a first electrode tab formed of a first uncoated portion and a second electrode tab formed of a second uncoated portion at a long side end along a winding direction, respectively, and wherein the first electrode tab and the second electrode tab protrude outside of the separator in opposite directions along a winding axis direction;

a battery housing accommodating the electrode assembly, and electrically connected to the second electrode tab;
a terminal installed to be insulated from the battery housing and exposed outside of the battery housing; and
a current collector plate disposed between the first electrode tab and the terminal for electrical connecting thereof, the current collector plate including:
an edge portion which defines a space inside;
a tab coupling portion extended from the edge portion in a centripetal direction and coupled to the first electrode tab;
a terminal coupling portion at a centripetal position relative to the edge portion; and
a connection portion connecting the terminal coupling portion to the edge portion while avoiding the tab coupling portion,
wherein the first electrode tab is coupled to the tab coupling portion of the current collector plate, and the terminal is coupled to the terminal coupling portion of the current collector plate,
wherein the first electrode tab includes a plurality of segments separated by cutout grooves along the winding direction and protruding outside of the separator along the winding axis direction,
wherein the plurality of segments is arranged to be overlapped along a radial direction of the electrode assembly to form a plurality of segment alignments spaced apart from each other in a circumferential direction of the electrode assembly,
wherein segments included in each segment alignment are bent along a radial direction to form a bent surface region,
wherein the tab coupling portion of the current collector plate is coupled to the bent surface region, and
wherein the connection portion is positioned between segment alignments of the plurality of segment alignments spaced apart from each other in the circumferential direction of the electrode assembly.

2. The battery according to claim 1, wherein the connection portion includes a notching portion having a reduction in cross sectional area, and wherein the notching portion is spaced apart from an end surface of the electrode assembly between the segment alignments spaced apart from each other in the circumferential direction.

3. The battery according to claim 2, wherein the end surface of the electrode assembly between the segment alignments spaced apart from each other in the circumferential direction is an electrolyte impregnation portion.

4. The battery according to claim 3, wherein in the electrolyte impregnation portion, an end of the first electrode and an end of the second electrode in the winding axis direction are exposed between the separator in an adjacent winding turn.

5. The battery according to claim 1, wherein the terminal coupling portion is aligned with a hole at a winding center of the electrode assembly.

6. The battery according to claim 1, wherein the battery housing has an open portion on a first side in the winding axis direction and a closed portion on a second side in the winding axis direction, and
 wherein the first electrode tab faces the closed portion, and the second electrode tab faces the open portion.

7. The battery according to claim 1, wherein the battery housing has an open portion on a first side in the winding axis direction one side and a closed portion on a second side in the winding axis direction, and the open portion is closed by a cap plate,
 wherein a sealing gasket is interposed between the cap plate and the open portion, and
 wherein the cap plate is not electrically connected to the first electrode tab and the second electrode tab of the electrode assembly.

8. The battery according to claim 1, wherein the battery housing has an open portion on a first side in the winding axis direction and a closed portion on a second side in the winding axis direction, and
 wherein the terminal is installed at a through-hole of the closed portion, and an insulation gasket is interposed between the terminal and the through-hole.

9. The battery according to claim 8, further comprising:
 an insulator disposed between the closed portion and the current collector plate.

10. The battery according to claim 9, wherein the terminal is coupled to the terminal coupling portion of the current collector plate through the insulator.

11. A battery pack, comprising:
 the battery according to claim 1; and
 a pack housing accommodating the battery in plural.

12. A vehicle comprising the battery pack according to claim 11.

* * * * *